(12) United States Patent
Ogumi et al.

(10) Patent No.: US 11,669,211 B2
(45) Date of Patent: Jun. 6, 2023

(54) ELECTROCONDUCTIVE FILM, TOUCH PANEL, AND IMAGE DISPLAY DEVICE

(71) Applicant: DAI NIPPON PRINTING CO., LTD., Tokyo (JP)

(72) Inventors: Shoichiro Ogumi, Tokyo (JP); Eiji Ooishi, Tokyo (JP); Yoshimasa Ogawa, Tokyo (JP); Yuji Shimizu, Tokyo (JP); Ryota Kitayama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/495,999

(22) PCT Filed: Mar. 20, 2018

(86) PCT No.: PCT/JP2018/011111
§ 371 (c)(1),
(2) Date: Sep. 20, 2019

(87) PCT Pub. No.: WO2018/174071
PCT Pub. Date: Sep. 27, 2018

(65) Prior Publication Data
US 2020/0057517 A1 Feb. 20, 2020

(30) Foreign Application Priority Data

Mar. 24, 2017 (JP) .............................. JP2017-059384

(51) Int. Cl.
*G06F 3/044* (2006.01)
(52) U.S. Cl.
CPC .................... *G06F 3/044* (2013.01)
(58) Field of Classification Search
CPC ...... G06F 3/044; G06F 3/0445; G06F 3/0446; G06F 3/0448; G06F 3/047;
(Continued)

(56) References Cited

U.S. PATENT DOCUMENTS 8,872,420 B2 * 10/2014 Brindisi .............. H01L 27/3213
313/498
2009/0284475 A1 11/2009 Nashiki et al.
(Continued)

FOREIGN PATENT DOCUMENTS

CN 101263564 9/2008
CN 104040642 9/2014
(Continued)

OTHER PUBLICATIONS

International Preliminary Report on Patentability, issued in the corresponding PCT Application No. PCT/JP2018/011111, dated Sep. 24, 2019, 14 pages.
(Continued)

*Primary Examiner* — Nathan Danielsen
(74) *Attorney, Agent, or Firm* — Hamre, Schumann, Mueller & Larson, P.C.

(57) ABSTRACT

One aspect of the present invention provides an electroconductive film 10 comprising a light-transmitting base material 11, a plurality of light-transmitting electroconductive parts 12 provided on one surface 11A of the light-transmitting base material 11, and a nonconductive part 13 located between the electroconductive parts 12, wherein each of the electroconductive parts 12 contains a light-transmitting resin 15 and an electroconductive fiber 16 incorporated in the light-transmitting resin 15; the nonconductive part 13 contains a light-transmitting resin 15; and the surface 13A of the nonconductive part 13 has an arithmetic average roughness of 3 nm or more.

10 Claims, 8 Drawing Sheets

(58) Field of Classification Search
CPC . G06F 2203/04102; G06F 2203/04103; G06F 2203/04112; H01B 5/14; H01B 5/16; H01B 13/12
See application file for complete search history.

(56) References Cited

U.S. PATENT DOCUMENTS

| | | | |
|---|---|---|---|
| 2013/0056244 A1* | 3/2013 | Srinivas | H05K 1/09 174/250 |
| 2015/0378461 A1 | 12/2015 | Hashimoto et al. | |
| 2016/0011698 A1 | 1/2016 | Tajiri et al. | |
| 2016/0073494 A1* | 3/2016 | Uchida | H05K 3/1283 345/173 |
| 2016/0224140 A1 | 8/2016 | Matsuda et al. | |
| 2016/0340773 A1 | 11/2016 | Ochi et al. | |
| 2017/0003773 A1* | 1/2017 | Kim | G06F 3/0446 |

FOREIGN PATENT DOCUMENTS

| | | |
|---|---|---|
| CN | 105027231 | 11/2015 |
| JP | 2010-140859 | 6/2010 |
| JP | 2013-201007 | 10/2013 |
| JP | 2014-209332 | 11/2014 |
| JP | 2014-216175 | 11/2014 |
| JP | 2015-50100 | 3/2015 |
| JP | 2015-95070 | 5/2015 |
| TW | 201505037 | 2/2015 |
| TW | 201641278 | 12/2016 |
| WO | 2012/023553 | 2/2012 |
| WO | 2013/029028 | 2/2013 |
| WO | 2015/005270 | 1/2015 |

OTHER PUBLICATIONS

International Search Report, issued in the corresponding PCT Application No. PCT/JP2018/011111, dated May 1, 2018, 4 pages.
First Chinese Office Action and Search Report, issued in the corresponding Chinese patent application No. 201880019483.6, dated Sep. 15, 2022, 8 pages.

* cited by examiner

ELECTROCONDUCTIVE FILM, TOUCH PANEL, AND IMAGE DISPLAY DEVICE

CROSS-REFERENCE TO RELATED APPLICATION

The present application enjoys the benefit of priority to the prior Japanese Patent Application Publication No. 2017-59384 (filed on Mar. 24, 2017), the entire disclosure of which is incorporated herein by reference.

TECHNICAL FIELD

The present invention relates to an electroconductive film, a touch panel, and an image display device.

BACKGROUND ART

Conventionally, electroconductive films have been widely used for sensors of touch panels and the like. An electroconductive film comprises a light-transmitting electroconductive layer made of indium tin oxide (ITO) which is provided on a light-transmitting base material (see, for example, Japanese Patent Application Publication No. 2015-95070).

However, ITO lacks flexibility, which causes a problem of the tendency of cracks on the light-transmitting electroconductive layer in cases where a flexible base material is used as the light-transmitting base material.

SUMMARY OF THE INVENTION

For this reason, the use of metal nanowires such as silver nanowires and the like in the electroconductive film instead of ITO has been currently studied. The patterning of an electroconductive layer containing metal nanowires can be performed by wet etching, but since wet etching is affected by chemicals, laser etching that is not affected by chemicals and that can selectively remove the metal nanowires is preferably performed.

However, the inventors of the present invention have found that, when an electroconductive layer is patterned by laser etching, the metal nanowires may remain in nonconductive parts, and that the remaining metal nanowires and metal ions which migrate from electroconductive parts together cause easily an electrical short circuit between the electroconductive parts.

The present invention is designed to solve the above problems. That is, one object is to provide an electroconductive film, a touch panel, and an image display device that can inhibit an electrical short circuit between electroconductive parts.

One aspect of the present invention provides an electroconductive film comprising a light-transmitting base material, a plurality of light-transmitting electroconductive parts provided on one surface of the light-transmitting base material, and a light-transmitting nonconductive part located between the electroconductive parts, wherein each of the electroconductive parts contains a light-transmitting resin and an electroconductive fiber incorporated in the light-transmitting resin; the nonconductive part contains a light-transmitting resin; and the surface of the nonconductive part has a three-dimensional arithmetic average roughness of 3 nm or more.

In the above electroconductive film, the three-dimensional arithmetic average roughness may be 80 nm or less.

In the above electroconductive film, the electroconductive fiber may have a fiber length of 1 μm or more.

In the above electroconductive film, the electroconductive fiber may have a fiber diameter of 200 nm or less.

In the above electroconductive film, the electroconductive film may have a haze value of 5% or less.

In the above electroconductive film, the electroconductive film may have a total light transmittance of 80% or more.

Another aspect of the present invention provides a touch panel comprising the above-described electroconductive film.

Another aspect of the present invention provides an image display device comprising the above-described electroconductive film or the above-described touch panel.

According to one aspect of the present invention, since the arithmetic average roughness on the surfaces of the nonconductive parts is 3 nm or more, an electroconductive film that can inhibit an electrical short circuit between the electroconductive parts can be provided. Additionally, according to other aspects of the present invention, a touch panel and an image display device which comprise such an electroconductive film can be provided.

DETAILED DESCRIPTION OF THE INVENTION

Figure 1:
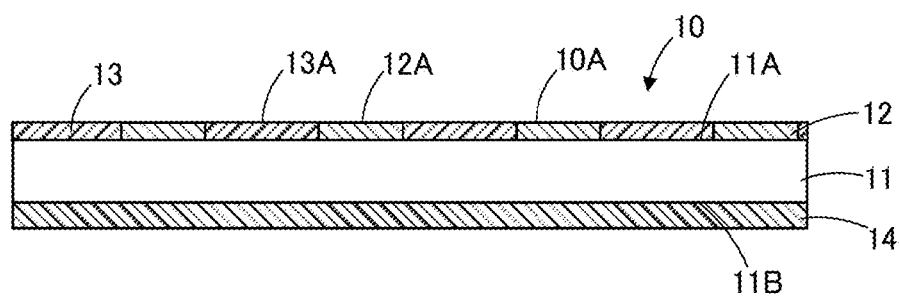
FIG. 1 depicts a schematic diagram of an electroconductive film according to one embodiment.
Figure 2:
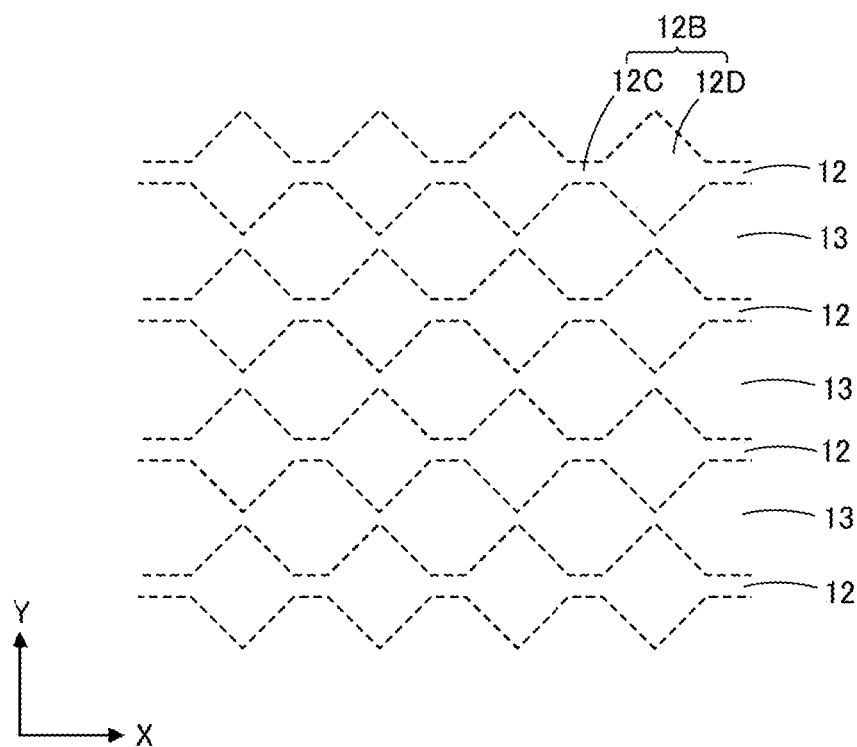
FIG. 2 depicts a schematic top view of an electroconductive film according to one embodiment.
Figure 3:
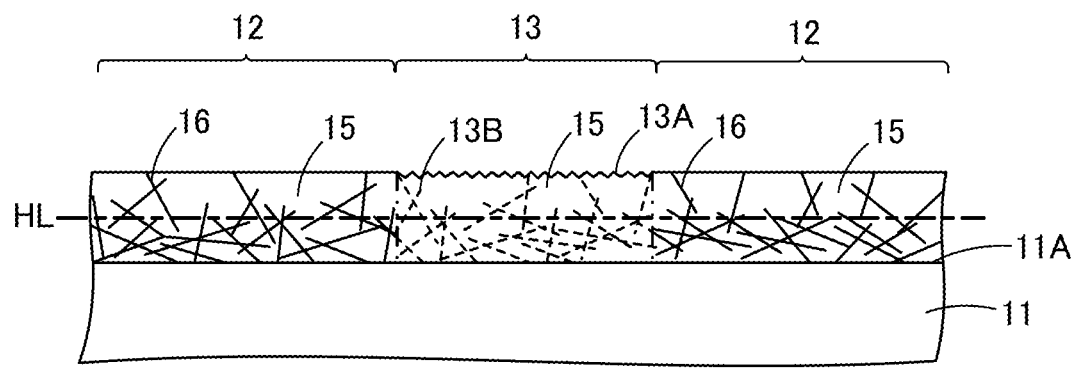
FIG. 3 depicts an enlarged view of a part of the electroconductive film shown in FIG. 1.
Figure 4:
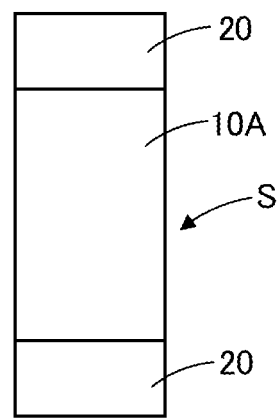
FIG. 4 depicts a top view of a sample measured for electrical resistance.
Figure 5A:
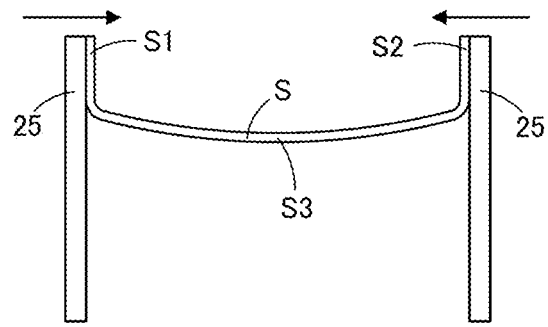
FIGS. 5(A) to 5(C) schematically illustrate each step of the foldability test.
Figure 5B:
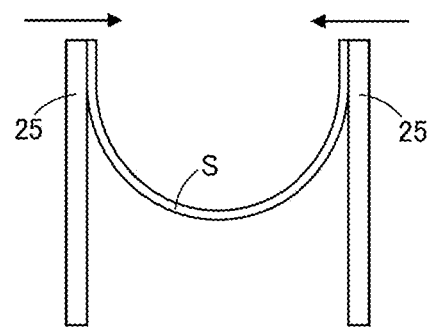
Figure 5C:
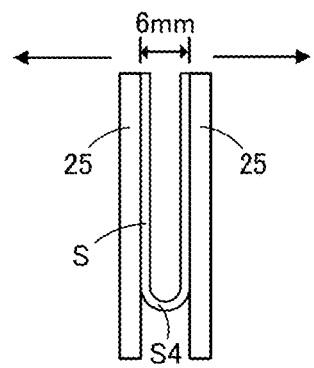
Figure 6A:
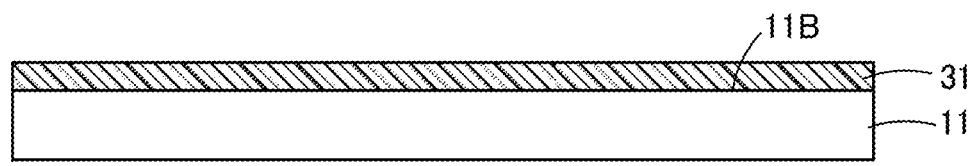
FIGS. 6(A) and 6(B) schematically illustrate the process for producing an electroconductive film according to one embodiment.
Figure 6B:
Figure 6B:
Figure 7A:
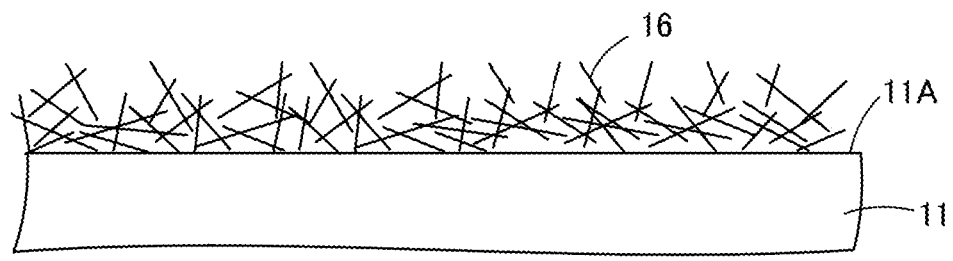
FIGS. 7(A) and 7(B) schematically illustrate the process for producing an electroconductive film according to one embodiment.
Figure 7B:
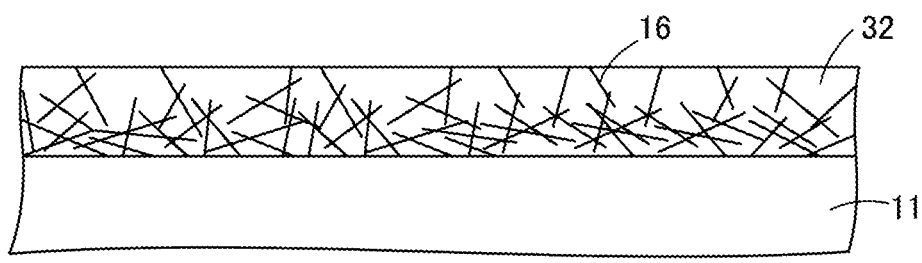
Figure 8A:
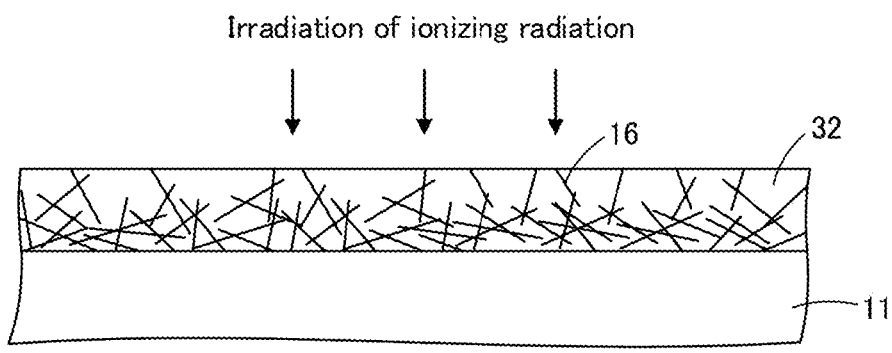
FIGS. 8(A) and 8(B) schematically illustrate the process for producing an electroconductive film according to one embodiment.
Figure 8B:
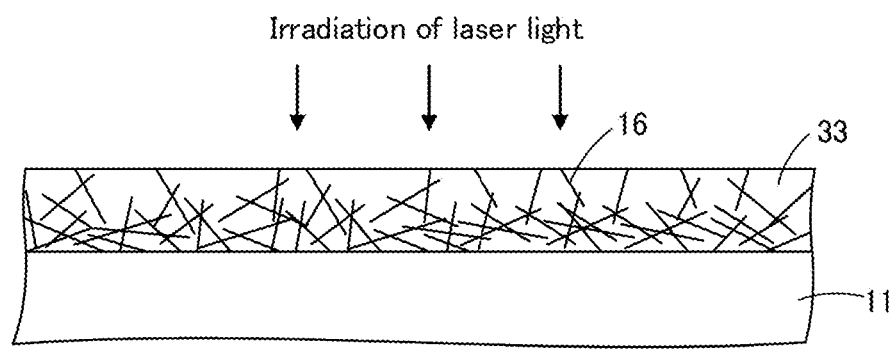

The electroconductive film, touch panel, and image display device according to an embodiment of the present invention will be described below with reference to the drawings. The term "light-transmitting" as used herein refers to a property of transmitting light. Additionally, the term "light-transmitting" does not necessarily refer to transparency and may refer to translucency. FIG. 1 depicts a schematic diagram of an electroconductive film according to the present embodiment; FIG. 2 depicts a schematic top view of an electroconductive film according to the present embodiment; and FIG. 3 depicts an enlarged view of a part of the electroconductive film shown in FIG. 1. FIG. 4 depicts a top view of a sample measured for electrical resistance, and FIG. 5 schematically illustrates each step of the foldability test. FIGS. 6 to 8 schematically illustrate the process for producing the electroconductive film according to the present embodiment.

<<<Electroconductive Film>>>

The electroconductive film 10 shown in FIG. 1 comprises a light-transmitting base material 11, a plurality of light-transmitting electroconductive parts 12 provided on one surface 11A of the light-transmitting base material 11, a light-transmitting nonconductive part 13 provided on one surface 11A of the light-transmitting base material 11 and located between the electroconductive parts 12, and a light-transmitting functional layer 14 provided on the other surface 11B opposite to the surface of the electroconductive parts 12 and the nonconductive part 13 side of the light-transmitting base material 11. However, the electroconductive film 10 should comprise the light-transmitting base material 11, the electroconductive parts 12, and the nonconductive part 13, and may not comprise the light-transmitting functional layer 14. The light-transmitting functional layer 14 is provided on the other surface 11B, but may be provided between the light-transmitting base material 11 and the electroconductive parts 12 as well as the nonconductive parts 13. Furthermore, the light-transmitting functional layer may be provided not only on the other surface 11B of the light-transmitting base material 11 but also between the light-transmitting base material 11 and the electroconductive parts 12 as well as the nonconductive parts 13. Additionally, in the electroconductive film 10 shown in FIG. 1, the electroconductive parts 12 and nonconductive parts 13 are provided only on one surface of the electroconductive film, but may be provided on both surfaces of the electroconductive film. The surface 10A of the electroconductive film 10 is constituted by the surfaces 12A of the electroconductive parts 12 and the surfaces 13A of the nonconductive parts 13.

The electroconductive film 10 has preferably a haze value (total haze value) of 5% or less. In cases where the electroconductive film 10 has a haze value of more than 5%, the electroconductive film may suffer from insufficient optical properties. The haze value can be obtained using a haze meter (product name "HM-150"; manufactured by Murakami Color Research Laboratory Co., Ltd.) according to JIS K7136: 2000. The haze value is a value measured on the whole electroconductive film and is also determined as the arithmetic mean of three measurement values obtained from one electroconductive film, wherein a sample having a size of 50 mm×100 mm is cut from the electroconductive film and the sample without curl or wrinkle and without any dirt such as fingerprints or dusts is then placed in the haze meter in such a manner that the electroconductive parts face in the direction opposite to the light source (this shall not apply to an electroconductive film comprising electroconductive parts on the both sides). The term "three measurements" as used herein does not mean three measurements at the same location and shall mean measurements at three different locations. The surface 10A of the electroconductive film 10 is visually determined to be flat, and the laminated layers, such as the electroconductive parts 12, likewise have a flat surface, and the deviation of film thickness is also within ±10%. Thus, the measurement of haze value at three different locations on the cut electroconductive film is considered to provide a rough average of the haze values measured on the whole electroconductive film. Additionally, if a sample having the above-described size cannot be cut from the electroconductive film, a sample having a diameter of 21 mm or more is required because, for example, the HM-150 haze meter has an entrance port aperture having a diameter of 20 mm for use in the measurement. Thus, a sample having a size of 22 mm×22 mm or more may be cut from the electroconductive film as appropriate. In cases where the electroconductive film is small in size, the electroconductive film is gradually shifted or turned in such an extent that the light source spot is within the electroconductive film, and three points of measurement are thereby obtained. The electroconductive film 10 has a haze value of 3% or less, 2% or less, 1.5% or less, 1.2% or less, or 1.1% or less in ascending order of preference (a lower value is more preferred). The deviation of the obtained haze value is within ±10% even though the measurement object has such a long size as a size of 1 m×3000 m or has almost the same size as that of a 5-inch smartphone; in cases where the deviation is within the above-described range, a low haze value and a low resistance value are more easily obtained.

The electroconductive film 10 preferably has a total light transmittance of 80% or more. In cases where the electroconductive film has a total light transmittance of less than 80%, the electroconductive film may suffer from insufficient optical properties. The total light transmittance can be obtained using a haze meter (product name "HM-150"; manufactured by Murakami Color Research Laboratory Co., Ltd.) according to JIS K7361-1: 1997. The total light transmittance is a value measured on the whole electroconductive film and is also determined as the arithmetic mean of three measurement values obtained from one electroconductive film, wherein a sample having a size of 50 mm×100 mm is cut from the electroconductive film and the sample without curl or wrinkle and without any dirt such as fingerprints or grime is then placed in the haze meter in such a manner that the electroconductive parts face in the direction opposite to the light source (this shall not apply to an electroconductive film comprising electroconductive parts on the both sides). The surface 10A of the electroconductive film 10 is visually determined to be flat, and the laminated layers, such as the electroconductive parts 12, likewise have a flat surface, and the deviation of film thickness is also within ±10%. Thus, the measurement of total light transmittance at three different locations on the cut electroconductive film is considered to provide a rough average of the total light transmittance values measured on the whole electroconductive film. Additionally, if a sample having the above-described size cannot be cut from the electroconductive film, a sample having a diameter of 21 mm or more is required because, for example, the HM-150 haze meter has an entrance port aperture having a diameter of 20 mm for use in the measurement. Thus, a sample having a size of 22 mm×22 mm or more may be cut from the electroconductive film as appropriate. In cases where the electroconductive film is small in size, the electroconductive film is gradually shifted or turned in such an extent that the light source spot is within the electroconductive film, and three points of measurement are thereby obtained. The electroconductive film 10 has a total light transmittance of 85% or more, 88% or more, or 89% or more in ascending order of preference (a higher value is more preferred). The deviation of the obtained total light transmittance is within ±10% even though the measurement object has such a long size as a size of 1 m×3000 m or has almost the same size as that of a 5-inch smartphone; in cases where the deviation is within the above-described range, a low haze value and a low resistance value are more easily obtained. Additionally, also in a whole multi-layered laminate such as a touch panel sensor comprising an electroconductive film, the total light transmittance is preferred to be the same as described above.

The electroconductive film 10 is preferably flexible. Specifically, even in cases where a test in which the electroconductive film 10 is folded by 180 degrees in a manner that leaves a gap of 6 mm between the opposite edges of the electroconductive film 10 (foldability test) is repeated twenty thousand times, the ratio between the electrical resistance values, as described later, measured before and after the foldability test on the surfaces 12A of the electroconductive parts 12 of the electroconductive film 10 is preferably 3 or less. In cases where the ratio between the electrical resistance values measured before and after the foldability test on the surfaces of electroconductive parts of an electroconductive film is more than 3 after repeating the foldability test on the electroconductive film twenty thousand times, the value of the ratio indicates the possibility that the electroconductive film is broken or otherwise damaged, which in turn means that the electroconductive film has poor flexibility. In this respect, any breakage or other damage to the electroconductive film by the foldability test reduces the electrical conductivity, which causes the electrical resistance value measured after the foldability test on the surfaces of the electroconductive parts of the electroconductive film to be higher than that measured before the foldability test on the surfaces of the electroconductive parts of the electroconductive film. Because of this respect, the determination of whether or not an electroconductive film is broken or otherwise damaged can be achieved by determining the ratio between the electrical resistance values measured before and after the foldability test on the surfaces of the electroconductive parts of the electroconductive film. In cases where the foldability test is repeated the number of times as specified above, in any case, the ratio between the electrical resistance values measured before and after the foldability test on the surfaces 12A of the electroconductive parts 12 of the electroconductive film 10 is more preferably 1.5 or less. The foldability test may be carried out by folding the electroconductive film 10 with the electroconductive parts 12 facing either inward or outward. In either case, the ratio between the electrical resistance values measured before and after the foldability test on the surfaces 12A of the electroconductive parts 12 of the electroconductive film 10 is preferred to be 3 or less.

The foldability test is performed as follows: first, a sample S which has a predetermined size (for example, a rectangular shape of 125 mm (length)×50 mm (width)) and which includes an electroconductive part 12 is cut from the electroconductive film 10 at an arbitrary site before the foldability test (see FIG. 4). If a sample cannot be cut into a size of 125 mm×50 mm, a sample may be cut into a size of, for example, 110 mm×50 mm. After samples S are cut from the electroconductive film before the foldability test, each of the samples S before the foldability test is measured for electrical resistance on the surface 12A of the electroconductive part 12. Specifically, as shown in FIG. 4, a silver paste (product name "DW-520H-14"; manufactured by Toyobo Co., Ltd.) is applied on both longitudinal ends of each sample S (for example, each end having a size of 10 mm length×50 mm width) to prevent any change in distance between points for measuring the electrical resistance, and heated at 130° C. for 30 minutes to provide a cured silver paste 20 to each end of the sample, and the electrical resistance of the sample S is then measured using a tester (product name "Digital MΩ Hitester 3454-11"; manufactured by Hioki E.E. Corporation). The distance between the points where the silver paste 20 has been applied (the length of the portion carrying no silver paste 20) is the distance between points for measuring the electrical resistance in the sample S (for example, 100 mm). When the electrical resistance is measured, probe terminals of the tester are individually contacted with either of the cured silver pastes 20 provided on both ends. After the electrical resistance on the surface 12A of the electroconductive part 12 is measured in the sample S before the foldability test, the sample S is subjected to the foldability test.

The foldability test is carried out as follows. The foldability test starts with fixing the edge S1 and opposite edge S2 of the selected sample S to fixing members 25 arranged in parallel to each other, as shown in FIG. 5(A). In addition, the fixing members 25 can slide in the horizontal direction, as shown in FIG. 5(A).

Next, the fixing members 25 are moved close to each other to fold and deform the sample S along the center part S3, as shown in FIG. 5 (B); the fixing members 25 are further moved until a gap of 6 mm is left between the two opposing edges S1 and S2 of the sample S fixed to the fixing members 25, as shown in FIG. 5 (C); subsequently, the fixing members 25 are moved in opposite directions to resolve the deformation of the sample S.

As shown in FIG. 5 (A) to (C), the fixing members 25 can be moved to fold the sample S by 180 degrees at the center part S3. In addition, a gap of 6 mm can be maintained between the two opposing edges S1 and S2 of the sample S by carrying out the foldability test in a manner that prevents the bent part S4 of the sample S from being forced out beyond the lower edges of the fixing members 25 and controls the fixing members 25 to keep a distance of 6 mm when they approach closest each other. In this case, the outer width of the bent part S4 is considered as 6 mm. The thickness of the sample S is small enough as compared with the gap between the fixing members 25 (6 mm). Thus, it seems unlikely that a difference in the thickness of the sample S affects the result of the foldability test on the sample S.

After the foldability test is performed, the sample S after the foldability test is measured for electrical resistance on the surface of the electroconductive part, similarly to the sample S before the foldability test. Then, the ratio of the electrical resistance value measured after the foldability test on the selected sample S to that measured before the foldability test on the same sample S (the electrical resistance of the selected sample after the foldability test/the electrical resistance of the same sample before the foldability test) is calculated. The arithmetic mean of three measurements is determined as the electrical resistance ratio.

The application of the electroconductive film according to the present invention including the electroconductive film 10 is not limited to a particular application, and may be used in various applications, for example, in which a transparent electroconductive film is used. Additionally, the electroconductive film of the present invention may be used for electrical appliances and windows for use in houses and vehicles (including all types of vehicles such as railroad cars and heavy-duty vehicles) as well as for products related to image display devices (including smartphone, tablet terminal, wearable terminal, personal computer, television, digital signage, public information display (PID), vehicle display, and the like). In particular, the electroconductive film of the present invention can suitably be used for products in which transparency is critical. Additionally, the electroconductive film of the present invention can suitably be used for electrical appliances in which not only technical features, such as transparency, but also designs are essential. Specific examples of the application of the electroconductive film according to the present invention include defrosters, antennas, solar cells, audio systems, loudspeakers, electric fans, interactive whiteboards, and carrier films for semiconductors and the like.

The electroconductive film of the present invention may be cut into a piece having a desired size or be rolled. In cases where the electroconductive film of the present invention has been cut into a piece having a desired size, the size of the electroconductive film piece is not limited to a particular size, and the size is appropriately determined depending on the display size of an image display device. Specifically, the electroconductive film piece may be, for example, 5 inches or more and 500 inches or less in size. The term "inch" as used herein shall mean the length of a diagonal when the electroconductive film is rectangular and to the length of a diameter when the electroconductive film is circular and to the average of major and minor axes when the electroconductive film is elliptical. In this respect, when the electroconductive film is rectangular, the aspect ratio of the electroconductive film which is measured to have the above-described inches is not limited to a particular aspect ratio as long as no problem is found with the electroconductive film to be used for the display screen of an image display device. Examples of the aspect ratio include height-to-width ratios of 1:1, 4:3, 16:10, 16:9, and 2:1. However, particularly in electroconductive films used for vehicle display and digital signage which are rich in designs, the aspect ratio is not limited to the above-described aspect ratios. Additionally, in cases where the electroconductive film 10 is large in size, the electroconductive film is appropriately cut starting at an arbitrary position to an easy-handling size such as A4 size (210 mm×297 mm) or A5 size (148 mm×210 mm) and then cut to fit size requirements of each measurement item.

<<Light-Transmitting Base Material>>

Examples of the light-transmitting base material 11 include a base material composed of a light-transmissive resin. Such a resin is not particularly limited as long as it is light transmissive, and examples thereof include polyolefin resins, polycarbonate resins, polyacrylate resins, polyester resins, aromatic polyetherketone resins, polyethersulfone resins, acetyl cellulose resins, polyimide resins, polyamide-imide resins, polyamide resins, and a mixture of two or more of these resins.

When a foldable electroconductive film is obtained as an electroconductive film, preferred examples of the resin constituting the light-transmitting base material include polyimide resins, polyamide-imide resins, polyamide resins, polyester resins and a mixture thereof from the viewpoint of their good foldability. Among these, polyimide resins, polyamide resins, or a mixture thereof are preferred because they show excellent hardness and transparency as well as excellent foldability, and also have excellent heat resistance, thereby imparting further excellent hardness and transparency by firing.

Examples of the polyolefin resin include polyethylene, polypropylene, cyclic polyolefin base materials and the like. Examples of the cyclic polyolefin resin include resins having the norbornene backbone.

Examples of the polycarbonate resin include aromatic polycarbonate containing a bisphenol (such as bisphenol A) as a base material, and aliphatic polycarbonate such as diethylene glycol bis(allyl carbonate).

Examples of the polyacrylate resin include methyl poly(meth)acrylate, ethyl poly(meth)acrylate, and methyl (meth)acrylate-butyl (meth)acrylate copolymers.

Examples of the polyester resin include at least one of polyethylene terephthalate (PET), polypropylene terephthalate, polybutylene terephthalate, and polyethylene naphthalate (PEN).

Examples of the aromatic polyetherketone resin include polyether ether ketone (PEEK).

Examples of the acetyl cellulose resin include triacetyl cellulose (TAC) and diacetyl cellulose. Triacetylcellulose is a resin which is capable of exhibiting an average light transmittance of 50% or more in the visible light region of 380 to 780 nm. The average light transmittance of triacetyl cellulose is preferably 70% or more, and more preferably 85% or more.

As triacetyl cellulose, in addition to pure triacetyl cellulose, those in combination with a component other than acetic acid as a fatty acid which forms an ester with cellulose may be also used, such as cellulose acetate propionate and cellulose acetate butyrate. These triacetyl cellulose resins may be added as necessary with other cellulose lower fatty acid esters such as diacetyl cellulose, or various additives such as plasticizers, ultraviolet absorbers, and lubricants.

A polyimide resin can be obtained from the reaction between a tetracarboxylic component and a diamine component. The polyimide resin is not particularly limited. For example, from the viewpoint of excellent light transmittance and rigidity, the polyimide resin preferably has at least one structure selected from the group consisting of the structures represented by the general formula (1) below and the general formula (3) below.

[Chem 1]

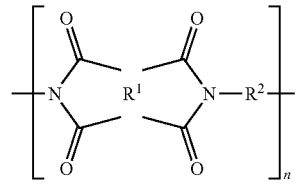

(1)

In the above-described general formula (1), $R^1$ represents a tetracarboxylic acid residue as a tetravalent group; $R^2$ represents at least one divalent group selected from the group consisting of trans-cyclohexanediamine residue, trans-1,4-bismethylene cyclohexanediamine residue, 4,4'-diaminodiphenyl sulfone residue, 3,4'-diaminodiphenyl sulfone residue, and divalent groups represented by the general formula (2) below; n represents the number of repeating units, which is 1 or more. In this specification, the "tetracarboxylic acid residue" refers to a residue remaining after subtracting four carboxylic groups from a tetracarboxylic acid, and represents the same structure as a residue remaining after subtracting the acid dianhydride structure from a tetracarboxylic dianhydride. Additionally, the "diamine residue" refers to a residue remaining after subtracting two amino groups from a diamine.

[Chem 2]

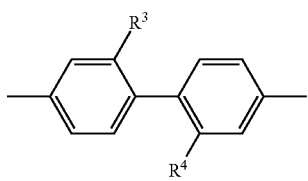

(2)

In the above-described general formula (2), $R^3$ and $R^4$ each independently represent a hydrogen atom, alkyl group, or perfluoroalkyl group.

[Chem 3]

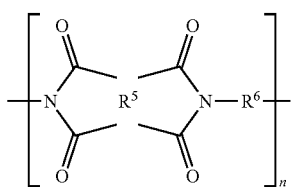

(3)

In the above-described general formula (3), $R^5$ represents at least one tetravalent group selected from the group consisting of cyclohexane tetracarboxylic acid residue, cyclopentane tetracarboxylic acid residue, a dicyclohexane-3,4,3',4'-tetracarboxylic acid residue, and a 4,4'-(hexafluoroisopropylidene)diphthalic acid residue; $R^6$ represents a diamine residue as a divalent group. n' represents the number of repeating units, which is 1 or more.

In the above-described general formula (1), $R^1$ refers to a tetracarboxylic acid residue and can represent, as indicated above, a residue remaining after subtracting the acid dianhydride structure from a tetracarboxylic dianhydride. As $R^1$ in the above-described general formula (1), at least one selected from the group consisting of 4,4'-(hexafluoroisopropylidene)diphthalic acid residue, 3,3',4,4'-biphenyl tetracarboxylic acid residue, pyromellitic residue, 2,3',3,4'-biphenyl tetracarboxylic acid residue, 3,3',4,4'-benzophenone tetracarboxylic acid residue, 3,3',4,4'-diphenylsulfone tetracarboxylic acid residue, 4,4'-oxydiphthalic acid residue, cyclohexane tetracarboxylic acid residue, and cyclopentane tetracarboxylic acid residue is preferably contained, among others, in terms of improving the light transmittance and the rigidity. At least one selected from the group consisting of 4,4'-(hexafluoroisopropylidene)diphthalic acid residue, 4,4'-oxydiphthalic acid residue, and 3,3',4,4'-diphenylsulfone tetracarboxylic acid residue is further preferably contained.

As $R^1$, those suitable residues are contained in total preferably at a content of 50% by mole or more, further preferably 70% by mole or more, and still further preferably 90% by mole or more.

Additionally, a combination of at least one selected from a group of tetracarboxylic acid residues suitable for improving the rigidity (group A), such as the group consisting of 3,3',4,4'-biphenyl tetracarboxylic acid residue, 3,3',4,4'-benzophenone tetracarboxylic acid residue, and pyromellitic residue, and at least one selected from a group of tetracarboxylic acid residues suitable for improving the transparency (group B), such as the group consisting of 4,4'-(hexafluoroisopropylidene)diphthalic acid residue, 2,3',3,4'-biphenyl tetracarboxylic acid residue, 3,3',4,4'-diphenylsulfone tetracarboxylic acid residue, 4,4'-oxydiphthalic acid residue, cyclohexane tetracarboxylic acid residue, and cyclopentane tetracarboxylic acid residue, is preferably used as $R^1$.

For the content ratio of the group of tetracarboxylic acid residues suitable for improving the rigidity (group A) to the group of tetracarboxylic acid residues suitable for improving the transparency (group B) in that case, preferably 0.05 moles or more and 9 moles or less, further preferably 0.1 moles or more and 5 moles or less, still further preferably 0.3 moles or more and 4 moles or less, of the group of tetracarboxylic acid residues suitable for improving the rigidity (group A) are combined with 1 mole of the group of tetracarboxylic acid residues suitable for improving the transparency (group B).

In the above-described general formula (1), $R^2$ preferably represents at least one divalent group selected from the group consisting of 4,4'-diaminodiphenyl sulfone residue, 3,4'-diaminodiphenyl sulfone residue, and divalent groups represented by the above-described general formula (2), further preferably at least one divalent group selected from the group consisting of 4,4'-diaminodiphenyl sulfone residue, 3,4'-diaminodiphenyl sulfone residue, and divalent groups represented by the above-described general formula (2) where $R^3$ and $R^4$ each represent a perfluoroalkyl group, among others, in terms of improving the light transmittance and the rigidity.

As $R^5$ in the above-described general formula (3), 4,4'-(hexafluoroisopropylidene)diphthalic acid residue, 3,3',4,4'-diphenylsulfone tetracarboxylic acid residue, and oxydiphthalic acid residue are preferably contained, among others, in terms of improving the light transmittance and the rigidity.

As $R^5$, those suitable residues are contained preferably at a content of 50% by mole or more, further preferably 70% by mole or more, and still further preferably 90% by mole or more.

In the above-described general formula (3), $R^6$ refers to a diamine residue and can represent, as indicated above, a residue remaining after subtracting two amino groups from a diamine. As $R^6$ in the above-described general formula (3), preferably at least one divalent group selected from the group consisting of 2,2'-bis(trifluoromethyl)benzidine residue, bis[4-(4-aminophenoxy)phenyl]sulfone residue, 4,4'-diaminodiphenyl sulfone residue, 2,2-bis[4-(4-aminophenoxy)phenyl]hexafluoropropane residue, bis[4-(3-aminophenoxy)phenyl]sulfone residue, 4,4'-diamino-2,2'-bis(trifluoromethyl)diphenyl ether residue, 1,4-bis[4-amino-2-(trifluoromethyl)phenoxy]benzene residue, 2,2-bis[4-(4-amino-2-trifluoromethylphenoxy)phenyl]hexafluoropropane residue, 4,4'-diamino-2-(trifluoromethyl)diphenyl ether residue, 4,4'-diaminobenzanilide residue, N,N'-bis(4-aminophenyl)terephthalamide residue, and 9,9-bis(4-aminophenyl)fluorene residue, further preferably at least one divalent group selected from the group consisting of 2,2'-bis(trifluoromethyl)benzidine residue, bis[4-(4-aminophenoxy)phenyl]sulfone residue, and 4,4'-diaminodiphenyl sulfone residue, is contained, among others, in terms of improving the light transmittance and the rigidity.

As $R^6$, those suitable residues are contained in total preferably at a content of 50% by mole or more, further preferably 70% by mole or more, and still further preferably 90% by mole or more.

Additionally, a combination of at least one selected from a group of diamine residues suitable for improving the rigidity (group C), such as the group consisting of bis[4-(4-aminophenoxy)phenyl]sulfone residue, 4,4'-diaminobenzanilide residue, N,N'-bis(4-aminophenyl)terephthalamide residue, paraphenylenediamine residue, methaphenylenediamine residue, and 4,4'-diaminodiphenylmethane residue, and at least one selected from a group of diamine residues suitable for improving the transparency (group D), such as the group consisting of 2,2'-bis(trifluoromethyl)benzidine residue, 4,4'-diaminodiphenyl sulfone residue, 2,2-bis[4-(4-aminophenoxy)phenyl]hexafluoropropane residue, bis[4-(3-aminophenoxy)phenyl]sulfone residue, 4,4'-diamino-2,2'-bis(trifluoromethyl)diphenyl ether residue, 1,4-bis[4-amino-2-(trifluoromethyl)phenoxy]benzene residue, 2,2-bis[4-(4-amino-2-trifluoromethylphenoxy)phenyl] hexafluoropropane residue, 4,4'-diamino-2-(trifluoromethyl)diphenyl ether residue, and 9,9-bis(4-aminophenyl)fluorene residue, is preferably used as $R^6$.

For the content ratio of the group of diamine residues suitable for improving the rigidity (group C) to the group of diamine residues suitable for improving the transparency (group D) in that case, preferably 0.05 moles or more and 9 moles or less, further preferably 0.1 moles or more and 5 moles or less, more preferably 0.3 moles or more and 4 moles or less, of the group of diamine residues suitable for improving the rigidity (group C) are combined with 1 mole of the group of diamine residues suitable for improving the transparency (group D).

For the structures represented by the above-described general formulae (1) and (3), n and n' each independently represent the number of repeating units, which is 1 or more. The number of repeating units, n, in the polyimide may be appropriately selected depending on the structure to allow the polyimide to have a preferred glass transition temperature as described below, and is not limited to a particular number. The average number of repeating units is typically 10 to 2,000, further preferably 15 to 1,000.

Additionally, the polyimide resin may partially contain a polyamide structure. Examples of the polyamide structure that may be contained include a polyamide-imide structure containing a tricarboxylic acid residue such as trimellitic anhydride, and a polyamide structure containing a dicarboxylic acid residue such as terephthalic acid.

The polyimide resin preferably has a glass transition temperature of 250° C. or higher, further preferably 270° C. or higher, in terms of heat resistance, while the polyimide resin preferably has a glass transition temperature of 400° C. or lower, further preferably 380° C. or lower, in terms of ease of stretching and of reducing the baking temperature.

The concept of polyamide resin includes aromatic polyamides (aramids) as well as aliphatic polyamides. The weight average molecular weight of the polyimide or polyamide resin is preferably in the range of 3,000 or more and 500,000 or less, more preferably from 5,000 to 300,000, and further preferably 10,000 or more and 200,000 or less. In cases where the weight average molecular weight is less than 3,000, the resin may not have enough strength; in cases where the weight average molecular weight is more than 500,000, the resin has an increased viscosity and a reduced solubility, which in turn may result in failure to provide a base material with smooth surface and homogeneous film thickness. The "weight average molecular weight" in the present specification is a value obtained by the dissolution in a solvent such as tetrahydrofuran (THF), followed by a conventionally known gel permeation chromatography (GPC) method based on polystyrene.

Among the polyimide and polyamide resins, the polyimide or polyamide resins having structures that inhibit intramolecular or intermolecular charge transfer are preferred due to the excellent transparency, specifically including the fluorinated polyimide resins, the polyimide resins containing alicyclic structures, and the halogenated polyamide resin.

Additionally, the fluorinated polyimide resins contain a fluorinated structure and thus have a high heat resistance, which protects a base material composed of any of the polyimide resins from coloration by the heat generated during the synthesis of the polyimide resin and helps the polyimide resin to maintain excellent transparency.

A commercially available base material may be used as a base material composed of the polyimide resin or a base material composed of the polyamide resin. Examples of a commercially available base material composed of the polyimide resin include Neopulim and the like manufactured by Mitsubishi Gas Chemical Company, Inc., while examples of a commercially available base material composed of the polyamide resin include Mictron and the like manufactured by Toray Industries, Inc.

The thickness of the light-transmitting base material 11 is not limited to a particular thickness, and the thickness can be 3 μm or more and 500 μm or less; the lower limit of thickness of the light-transmitting base material 11 is 10 μm or more or 20 μm or more in ascending order of preference (a higher value is more preferred) from the viewpoint of, for example, handling properties. The upper limit of thickness of the light-transmitting base material 11 is 250 μm or less, 100 μm or less, 80 μm or less, 60 μm or less, or 40 μm or less in ascending order of preference (a lower value is more preferred) from the viewpoint of thinning the electroconductive film. The thickness of the light-transmitting base material can be measured by the same measurement method as for the film thickness of the below-described electroconductive parts.

The surface of the light-transmitting base material 11 may have a surface treated by a physical treatment such as corona discharge treatment or oxidation treatment to improve the adhesiveness. Additionally, the light-transmitting base material 11 may have a underlayer on at least one surface for the purpose of improving adhesion to other layers, preventing the electroconductive film from sticking to itself when the electroconductive film is rolled, and/or inhibiting cissing of a coating liquid applied for forming another layer. In this specification, however, the underlayer provided on at least one surface of the light-transmitting base material and attached to the light-transmitting base material will be an integral part of the light-transmitting base material and will never be a part of the light-transmitting functional layer.

The underlayer contains, for example, an anchoring agent and/or a priming agent. As the anchoring agent and the priming agent, at least any of, for example, polyurethane resins, polyester resins, polyvinyl chloride resins, polyvinyl acetate resins, vinyl chloride-vinyl acetate copolymers, acrylic resins, polyvinyl alcohol resins, polyvinyl acetal resins, copolymers of ethylene and vinyl acetate or acrylic acid, copolymers of ethylene and styrene and/or butadiene, thermoplastic resins such as olefin resins and/or modified resins thereof, polymers of radiation-polymerizable compounds, polymers of thermopolymerizable compounds, and the like can be used.

The underlayer may contain particles of a lubricant or the like for the purpose of preventing the electroconductive film from sticking to itself when the electroconductive film is rolled, as described above. Examples of the particles include silica particles.

<<Light-Transmitting Functional Layer>>

The light-transmitting functional layer 14 is placed on the other surface 11B of the light-transmitting base material 11. The term "light-transmitting functional layer" as used herein refers to a layer transmitting light and intended to achieve some functions in the electroconductive film. Specific examples of the light-transmitting functional layer include layers which exert functions, such as hard coat properties, refractive index modulation, elution inhibition, and/or color modulation. The light-transmitting functional layer may have a monolayer structure or a multilayer structure composed of two or more laminated layers. In cases where the light-transmitting functional layer is a laminate composed of two or more layers, each layer may have the same or a different function. In this embodiment, the light-transmitting functional layer 14 is described as a layer having hard coat properties, namely a hard coat layer.

The light-transmitting functional layer 14 functions as a hard coat layer, as described above, and the light-transmitting functional layer 14 exhibits a hardness of "H" or harder in the pencil hardness test (at a load of 4.9 N) specified by JIS K5600-5-4: 1999. By limiting the pencil hardness to a hardness of "H" or harder, the resulting electroconductive film 10 can have sufficient hardness to increase durability. The upper limit of the pencil hardness of the surface of the light-transmitting functional layer 14 is preferably around 4H in terms of the toughness of the light-transmitting functional layer and from the viewpoint of inhibiting curling.

The light-transmitting functional layer 14 preferably has a film thickness of 0.5 µm or more and 15 µm or less. By limiting the film thickness to a value within the above range, the light-transmitting functional layer 14 can achieve a desired hardness. The film thickness of the light-transmitting functional layer can be measured by the same measurement method as for the film thickness of the below-described electroconductive parts. The lower limit of the film thickness of the light-transmitting functional layer 14 is 1 µm or more, 1.5 µm or more, or 2 µm or more in ascending order of preference (a higher value is more preferred) from the viewpoint of inhibiting curling. Additionally, the upper limit of the film thickness of the light-transmitting functional layer 14 is 12 µm or less, 10 µm or less, 7 µm or less, or 5 µm or less in ascending order of preference (a lower value is more preferred) from the viewpoint of inhibiting cracks from occurring in the light-transmitting functional layer. In order to make the light-transmitting functional layer thinner while the curling is inhibited, the light-transmitting functional layer 14 preferably has a film thickness of 0.5 µm or more and 10 µm or less.

Since the light-transmitting functional layer 14 functions as a hard coat layer, the film thickness of the light-transmitting functional layer 14 is preferably in the above range. On the other hand, when the light-transmitting functional layer functions as an elution inhibition layer that inhibits the elution of oligomers or the like from the light-transmitting base material, the film thickness of the light-transmitting functional layer is preferably 10 nm or more and 400 nm or less, and more preferably 50 nm or more and 150 nm or less.

The light-transmitting functional layer 14 can be composed of at least a light-transmitting resin. The light-transmitting functional layer 14 may additionally contain inorganic particles, organic particles, and a leveling agent, in addition to a resin.

<Light-Transmitting Resin>

The light-transmitting resin in the light-transmitting functional layer 14 includes resins containing a polymer (a cured or cross-linked product) of a polymerizable compound. The light-transmitting resin may contain a resin which cures by solvent evaporation, in addition to a polymer of a polymerizable compound. Examples of the polymerizable compound include ionizing radiation-polymerizable compounds and/or thermopolymerizable compounds.

The ionizing radiation-polymerizable compound refers to a compound having at least one ionizing radiation-polymerizable functional group in one molecule. The term "ionizing radiation-polymerizable functional group" as used herein refers to a functional group which can undergo ionizing radiation-induced polymerization. Examples of the ionizing radiation-polymerizable functional groups include ethylenic unsaturated groups such as (meth)acryloyl group, vinyl group, and allyl group. Both "acryloyl group" and "methacryloyl group" are meant by the word "(meth)acryloyl group." In addition, the types of ionizing radiation applied to induce polymerization of an ionizing radiation-polymerizable compound include visible light, ultraviolet light, X ray, electron beam, α ray, β ray, and γ ray.

Examples of the ionizing radiation-polymerizable compound include ionizing radiation-polymerizable monomers, ionizing radiation-polymerizable oligomers, and ionizing radiation-polymerizable prepolymers; these compounds can be used as appropriate. A combination of an ionizing radiation-polymerizable monomer and an ionizing radiation-polymerizable oligomer or prepolymer is preferred as the ionizing radiation-polymerizable compound.

Examples of the ionizing radiation-polymerizable monomer include monomers containing a hydroxyl group(s), such as 2-hydroxyethyl (meth)acrylate, 2-hydroxypropyl (meth)acrylate, and 2-ethylhexyl (meth)acrylate; and (meth)acrylate esters, such as ethylene glycol di(meth)acrylate, diethylene glycol di(meth)acrylate, triethylene glycol di(meth)acrylate, tetraethylene glycol di(meth)acrylate, tetramethylene glycol di(meth)acrylate, trimethylolpropane tri(meth)acrylate, trimethylolethane tri(meth)acrylate, pentaerythritol di(meth)acrylate, pentaerythritol tri(meth)acrylate, pentaerythritol tetra(meth)acrylate, dipentaerythritol tetra(meth)acrylate, dipentaerythritol hexa(meth)acrylate, and glycerol (meth)acrylate.

A polyfunctional oligomer having two or more functional groups, for example a polyfunctional oligomer having three or more ionizing radiation-polymerizable functional group (i.e., trifunctional or higher), is preferred as the ionizing radiation-polymerizable oligomer. Examples of the above-described polyfunctional oligomer include polyester (meth)acrylate, urethane (meth)acrylate, polyester-urethane (meth)acrylate, polyether (meth)acrylate, polyol (meth)acrylate, melamine (meth)acrylate, isocyanurate (meth)acrylate, and epoxy (meth)acrylate.

The ionizing radiation-polymerizable prepolymer may have a weight average molecular weight of 10,000, for example. The ionizing radiation-polymerizable prepolymer has preferably a weight average molecular weight of 10,000 or more and 80,000 or less, and more preferably a weight average molecular weight of 10,000 or more and 40,000 or less. In cases where the weight average molecular weight is more than 80,000, the ionizing radiation-polymerizable prepolymer has a high viscosity and thus reduces the suitability as a coating material, which may deteriorate the appearance of the resulting light-transmitting functional layer. Examples of the polyfunctional prepolymer include urethane (meth)acrylate, isocyanurate (meth)acrylate, polyester-urethane (meth)acrylate, and epoxy (meth)acrylate.

The thermopolymerizable compound refers to a compound having at least one thermopolymerizable functional group in one molecule. The term "thermopolymerizable functional group" as used herein refers to a functional group which can undergo heat-induced polymerization with the same type of functional group or with other types of functional groups. Examples of the thermopolymerizable functional group include hydroxyl group, carboxyl group, isocyanate group, amino group, cyclic ether group, and mercapto group.

The thermopolymerizable compound is not limited to a particular thermopolymerizable compound, and examples of the thermopolymerizable compound include epoxy compounds, polyol compounds, isocyanate compounds, melamine compounds, urea compounds, and phenol compounds.

The resin which cures by solvent evaporation refers to a resin, such as a thermoplastic resin, which forms a coat film when a solvent added to the resin for adjusting the content of solids for coating process is evaporated. In the formation of the light-transmitting functional layer 14, addition of a resin which cures by solvent evaporation can effectively prevent failure in coating on a surface where a coating liquid is applied. The resin which cures by solvent evaporation is not limited to a particular resin, and a thermoplastic resin can generally be used as the resin which cures by solvent evaporation.

Examples of the thermoplastic resin can include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubber or elastomer materials.

The thermoplastic resin is preferably amorphous and soluble in an organic solvent (particularly, a solvent which can generally dissolve plural polymers or curable compounds). In particular, for example, styrene resins, (meth) acrylic resins, alicyclic olefin resins, polyester resins, and cellulose derivatives (such as cellulose esters) are preferred in terms of transparency and/or weather resistance.

<Inorganic Particles>

The inorganic particles are a component intended to increase the mechanical strength and pencil strength of the light-transmitting functional layer 14, and examples of the inorganic particles include inorganic oxide particles, such as silica ($SiO_2$) particles, alumina particles, titania particles, tin oxide particles, antimony-doped tin oxide (abbreviation: ATO) particles, and zinc oxide particles. Among those particles, silica particles are preferred from the viewpoint of further increasing the hardness. Examples of the silica particles include spherical silica particles and deformed silica particles; among those silica particles, deformed silica particles are preferred. In this specification, the "spherical particle" refers to, for example, a spherical or ellipsoidal particle, while "deformed particle" refers to a particle with a randomly rough surface as observed on potato tubers. The surface area of the above-described deformed particle is larger than that of a spherical particle, and the presence of such deformed particles thus increases the contact area with, for example, the above-described polymerizable compound and successfully improves the pencil hardness of the light-transmitting functional layer 14 to a higher level. Observation of a cross-section of the light-transmitting functional layer 14 with a transmission electron microscope (TEM) or a scanning transmission electron microscope (STEM) can confirm whether the silica particles contained in the light-transmitting functional layer 14 are deformed silica particles or not. In cases where spherical silica particles are used, spherical silica particles with smaller particle diameters lead to higher hardness in the light-transmitting functional layer.

On the other hand, deformed silica particles can achieve a hardness equivalent to that of commercially available spherical silica particles with the smallest particle diameter even if those deformed silica particles are not as small as those spherical silica particles.

The average primary particle diameter of the deformed silica particles is preferably 1 nm or more and 100 nm or less. Even if deformed silica particles have an average primary particle diameter within the above-described range, the deformed silica particles can achieve a hardness equivalent to that of spherical silica particles with an average primary particle diameter of 1 nm or more and 45 nm or less. The average primary particle diameter of deformed silica particles is determined as the arithmetic mean of the particle diameters of 20 particles, wherein each particle diameter is obtained as the average between the maximum (major axis) and the minimum (minor axis) values of the distance between two points on the circumference of each particle measured on a cross-sectional image of a light-transmitting functional layer acquired using a transmission electron microscope (TEM) or a scanning transmission electron microscope (STEM). Additionally, the average particle diameter of spherical silica particles is determined as the arithmetic mean of the particle diameters of 20 particles, wherein the particle diameters of 20 particles are measured on cross-sectional images of particles acquired using a transmission electron microscope (TEM) or a scanning transmission electron microscope (STEM). When cross-sections are imaged using a scanning transmission electron microscope (STEM) (product name "S-4800 (Type 2)"; manufactured by Hitachi High-Technologies Corporation), the cross-sections are observed by setting the detector switch (signal selection) to "TE," the accelerating voltage to "30 kV," and the emission current to "10 µA." As other imaging conditions for acquiring images of cross-sections by STEM, the below-described conditions can be referenced. Additionally, the average primary particle diameter can be determined by binarizing and calculating the image data as described below.

The content of inorganic particles in the light-transmitting functional layer 14 is preferably 20% by mass or more and 70% by mass or less. In cases where the content of inorganic particles is less than 20% by mass, securing a sufficient hardness is challenging; additionally, in cases where the content of inorganic particles is more than 70% by mass, the filling ratio is increased excessively, which reduces the adhesion between the inorganic particles and the resin component and conversely results in reduced hardness of the light-transmitting functional layer.

As the inorganic particles, inorganic particles having ionizing radiation-polymerizable functional groups on the surface (reactive inorganic particles) are preferably used. Such inorganic particles having ionizing radiation-polymerizable functional groups on the surface can be produced by surface treatment of inorganic particles with, for example, a silane coupling agent. Examples of the method of treating the surface of inorganic particles with a silane coupling agent include a dry method in which the silane coupling agent is sprayed over the inorganic particles, and a wet method in which the inorganic particles are dispersed in a solvent and the silane coupling agent is then added to the solvent and allowed to react with the inorganic particles.

<Organic Particles>

The organic particles are also a component intended to increase the mechanical strength and pencil strength of the light-transmitting functional layer 14, and examples of the organic particles include plastic beads. Specific examples of the plastic beads include polystyrene beads, melamine resin beads, acrylic beads, acrylic-styrene beads, silicone beads, benzoguanamine beads, benzoguanamine-formaldehyde condensation beads, polycarbonate beads, and polyethylene beads.

<<Electroconductive Part>>

The electroconductive parts 12 contain a light-transmitting resin 15 and an electroconductive fiber 16 incorporated in the light-transmitting resin 15, as shown in FIG. 3. The term "electroconductive part" as used herein refers to a layer containing electroconductive fibers, which are found by observing a cross-section of the electroconductive film with a scanning transmission electron microscope (STEM) or a transmission electron microscope (TEM). If the boundary surface of the electroconductive part is hard to be observed, the surface of the electroconductive part should undergo any pretreatment process commonly used for electron microscopy, such as formation of a metal layer of Pt—Pd, Au, or the like by sputtering. Additionally, the whole electroconductive film may be embedded in a resin and then stained with osmium tetraoxide, ruthenium tetraoxide, phosphotungstic acid, or the like because such staining enables easier observation of the interface between organic layers. Additionally, the term "electroconductive part" refers a part containing a light-transmitting resin and an electroconductive fiber incorporated in the light-transmitting resin and being capable of conducting electricity from the surface, and the concept includes both layered and non-layered structures. Additionally, the term "electroconductive fiber" as used herein refers to a fiber having electrical conductivity and a length much longer than the thickness (for example, the diameter); for example, the electroconductive fiber will include a fiber having electrical conductivity and a length that is approximately equal to or more than five times as long as the thickness. Additionally, as shown in FIG. 3, the light-transmitting resin 15 in the electroconductive parts 12 may be communicated with the light-transmitting resin 15 in the nonconductive parts 13. The electroconductive parts 12 preferably further contain a reaction inhibitor which is contained in the light-transmitting resin 15.

The electroconductive parts 12 can conduct electricity from the surfaces 12A of the electroconductive parts 12. Measurement of the surface resistance of an electroconductive part can determine whether or not the electroconductive part can conduct electricity from the surface of the electroconductive part. The method of measuring the surface resistance of an electroconductive part will be described hereinafter and the description of the method is omitted here. In cases where the arithmetic mean of the surface resistance values of an electroconductive part is less than $1 \times 10^6$ $\Omega/\square$, the electroconductive part can be determined to conduct electricity from the surface. Although a majority of the electroconductive fibers 16 are distributed on the light-transmitting base material 11 side than the position HL, which is located at half the film thickness of the electroconductive parts 12, as described below, the remaining electroconductive fibers 16 are stacked on the electroconductive fibers 16 which are distributed toward the light-transmitting base material 11, and consequently distributed from the position HL, which is located at half the film thickness of the electroconductive parts 12, to the surfaces 12A, and also exposed on the surfaces 12A of the electroconductive parts 12. Thus, the electroconductive parts 12 can conduct electricity from the surfaces 12A.

In the electroconductive parts 12, it is preferred that the electroconductive fibers 16 are unevenly distributed on the light-transmitting base material 11 side than the position HL, which is located at half the film thickness of the electroconductive parts 12 (the light-transmitting resin 15), as shown in FIG. 3. The determination of whether or not the electroconductive fibers 16 are unevenly distributed on the light-transmitting base material 11 side than the position HL, which is located at half the film thickness of the electroconductive parts 12, can be achieved as follows. First, samples for observing a cross-section are prepared from an electroconductive film. More specifically, a cut piece of electroconductive film having a size of 2 mm×5 mm is placed in an embedding plate made of silicone, into which an epoxy resin is later poured to embed the whole electroconductive film in the resin. Then, the embedding resin is left to stand at 65° C. for 12 hours or longer and cured. Subsequently, ultra-thin sections are prepared using an ultramicrotome (product name "Ultramicrotome EM UC7"; manufactured by Leica Microsystems GmbH) at a feeding rate of 100 nm. The prepared ultra-thin sections are collected on collodion-coated meshes (150 meshes) to obtain STEM samples. If these samples conduct no electricity, images observed by STEM will appear blurry. Thus, the samples are preferably sputtered with Pt—Pd for about 20 seconds. The sputtering time can be appropriately adjusted but needs careful attention; a period of 10 seconds is too short, and a period of 100 seconds is so long that the metal used for sputtering is observed as particulate foreign bodies. Then, a cross-sectional image of an electroconductive part in a STEM sample is photographed using a scanning transmission electron microscope (STEM) (product name "S-4800 (Type 2)"; manufactured by Hitachi High-Technologies Corporation). The cross-section is observed and imaged under STEM at a magnification of 5,000 to 200,000 times by setting the detector switch (signal selection) to "TE," the accelerating voltage to "30 kV," and the emission current to "10 µA," and appropriately adjusting the focus, contrast, and brightness so that each layer can be identified. The magnification is preferably in the range from 10,000 to 100,000 times, more preferably in the range from 10,000 to 50,000 times, and most preferably in the range from 25,000 to 50,000 times. The cross-section may be imaged by additionally setting the beam monitor aperture to 3 and the objective lens aperture to 3, and also setting the WD to 8 mm. Then, the cross-sectional images at 10 locations photographed as described above are prepared. Upon completion of photographing the cross-sectional images of the electroconductive part, the position located at half the film thickness of the electroconductive part is determined on each cross-sectional image. Then, it is determined whether or not electroconductive fibers appearing on each cross-sectional image are distributed on the light-transmitting base material side than the half-length position. Specifically, first of all, electroconductive fibers in the above-described electron microscopic cross-sectional images of the electroconductive part are visualized as darker areas (for example, in black) compared to the light-transmitting resin, so that electroconductive fibers can be identified in the cross-sectional images of the electroconductive part. Meanwhile, by enlarging each cross-sectional image, pixels that make up the image become visible. All pixels are the same size and are arranged into a grid (lattice). The numbers of pixels covering the electroconductive fibers distributed on the light-transmitting base material side than the above-described half-length position and covering the electroconductive fibers distributed on the surface side of the electroconductive part than the above-described half-length position are counted in each cross-sectional image to determine the ratio of the number of pixels covering the electroconductive fibers distributed on the light-transmitting base material side than the above-described half-length position relative to the total number of pixels covering all the electroconductive fibers. In this respect, for the pixels covering an electroconductive fiber, each pixel on the line running through the above-described half-length position will be divided into a portion located on the light-transmitting base material side than the above-described half-length position and the remaining portion located on the surface of the electroconductive part than the above-described position, to divide one pixel based on the area ratio between the divided portions. Then, the above-described ratio determined from the cross-sectional images is determined as the existence ratio of electroconductive fibers distributed on the light-transmitting base material side than the position located at half the film thickness of the electroconductive part. In cases where the existence ratio is 55% or more, the electroconductive fibers are determined to be unevenly distributed on the light-transmitting base material side than the position located at half the film thickness of the electroconductive part. The existence ratio should be the arithmetic mean of the existence ratio values determined from the cross-sectional images. Incidentally, a low surface resistance value represents even distribution of electroconductive fibers in an electroconductive part. Therefore, the existence ratio of electroconductive fibers determined using cross-sectional images of a portion of the electroconductive part is considered as the existence ratio of electroconductive fibers in the whole electroconductive parts. The existence ratio of electroconductive fibers distributed on the light-transmitting base material side than the position located at half the film thickness of the electroconductive parts, which is determined from the above-described cross-sectional images, is more preferably 70% or more, further more preferably 80% or more.

The determination of whether or not the electroconductive fibers 16 are unevenly distributed on the light-transmitting base material 11 side than the position HL, which is located at half the film thickness of the electroconductive parts 12, can also be achieved as follows. First, a first sample of the electroconductive film in which a metal layer of Pt—Pd, Pt, Au, or the like has been formed by sputtering on the surfaces of the electroconductive parts and a second sample of the same electroconductive film in which a metal layer is not formed on the surface are prepared. Then, the film thickness of the electroconductive parts 12 is determined using the first sample by the below-described measurement method. Additionally, the second sample is used to photograph cross-sectional images of an electroconductive part by the above-described method, and the photographed cross-sectional image data is loaded to and binarized by image analysis and measurement software (product name "WinROOF Version 7.4"; manufactured by Mitani Corporation). In STEM observations, the difference in intensity of the transmitted electron beam produces image contrast; high density metals are hard to transmit a beam of electrons and thus are visualized in black, and organic materials, which have a lower density than metals, are visualized in white. Thus, the portions visualized in black are determined as electroconductive fibers and the remaining portions visualized in gray to white in the image data are determined as a light-transmitting resin. Accordingly, in cases where the ratio of a black-colored area in the area located on the light-transmitting base material side than the position located at half the film thickness of the electroconductive part is larger than the ratio of a black-colored area in the area located on the surface side of the electroconductive part than the above-described half-length position, the electroconductive fibers 16 can be determined to be unevenly distributed on the light-transmitting base material 11 side than the position HL, which is located at half the film thickness of the electroconductive parts 12. The portions visualized in black can be extracted based on the luminance. Additionally, the difference in contrast between images of metals and organic materials is so clear that the area of each portion can be determined by an automated area measurement system alone.

The above-described binarization-mediated area measurement is performed as follows. First, a cross-sectional image is loaded to the above-described software and displayed on the image window of the software program. Then, either below or above the position located at half the film thickness in ROIs (processing area) are selected as subjects of image processing in the image window and then binarized to calculate the total areas covered by electroconductive fibers. The selection of a processing area is carried out by clicking the rectangular ROI selection button in the image tool bar and setting a rectangular ROI in the image window. The above-described software outputs each measured value in pixel unit, which can be converted and outputted as a real length after calibration. When an area ratio is calculated, the measured value in pixel unit is not needed to be converted to a real length for the purpose of determining whether or not electroconductive fibers are unevenly distributed on the light-transmitting base material side, but calibration is required for measuring the surface resistance value and the haze value and for imaging the presence of fibers in the electroconductive film. Each STEM image displays a scale, which can be used to perform the ROI calibration. Specifically, the line ROI selection button in the image tool bar is clicked to draw a line having a length equal to the scale displayed in each STEM image, and the calibration dialog box is then displayed to choose the drawn line and to input the length value of the scale displayed in the STEM image and the unit for the length value. In binarization, the areas covering electroconductive fibers are separated from other areas. Specifically, binarization with two thresholds is selected from the menu of binarization. Because each electroconductive fiber has a high density and is visualized in black and the remaining region is visualized in white to gray, appropriately selected two density (brightness) thresholds (for example, 0 and 80) are inputted to perform binarization with two thresholds. If the area covered by electroconductive fibers in an actual STEM image does not exactly match with the area covered by the same electroconductive fibers (colored in, for example, green) in a binarized image produced by applying the thresholds to convert the image into two colors, the binarized image is corrected by appropriately changing the values of the thresholds until a binarized image most closely resembling the STEM image is obtained. For example, the difference between the STEM image and the binarized image can be appropriately corrected by the fill function and/or the delete function selected from the binarization menu. Any uncolored area inside or any excess colored area outside a binarized electroconductive fiber identified by the comparison with the same actual electroconductive fiber will be filled with a color or deleted. For the addition or deletion of a colored area, an area of interest can be filled with a color or be deleted by adjusting the threshold value for the area. Clicking an area to be deleted gives a threshold value suitable for deleting the area. The binarized image would be corrected as much as possible by other functions in the binarization menu as necessary, so that the resulting binarized image is matched with the STEM image. Additionally, an excess colored area in the binarized image can also be manually selected and deleted using the eraser tool button. In addition, an area can also be filled with a color for correction using the pen tool button through manual painting in the window. Upon completion of this task, one of the shape features in the analysis menu is selected to choose areas to be measured. The summed areas of electroconductive fibers can be determined, as well as the area of each of the electroconductive fibers is measured. By the above-described operation, the total areas below and above the position located at half the film thickness of the electroconductive layer are determined, and the areas of the ROIs located below and above the position at half the film thickness are further determined by manual measurement, and the above-described ratio is thereby calculated. The manual measurement can be performed by selecting the line length measurement function from the manual measurement functions in the analysis menu and choosing all the line length measurement items. Tools in the line length tool palette can be appropriately used to measure the length of a line and the area of a ROI selected by dragging the cursor from a start point to an end point with a mouse button. The details of the task will be according to the WinROOF Version 7.4 User's Manual.

The surfaces 12A of the electroconductive parts 12 have preferably a resistance value (surface resistance value) of $1000\Omega/\square$ or less. In cases where the surfaces 12A of the electroconductive parts 12 have a surface resistance value of more than $1000\Omega/\square$, particularly problems such as slow response speed may occur in touch panel applications. The surface resistance value can be measured using either a contact-type resistivity meter (product name "Loresta-AX MCP-T370"; Manufactured by Mitsubishi Chemical Analytech Co., Ltd., Type of sensor: ASP-probe) according to JIS K7194: 1994 (Testing method for resistivity of electroconductive plastics with a four-point probe array) or a non-destructive (based on the eddy current method) resistivity meter (product name "EC-80P"; manufactured by Napson Corporation; <URL:https://www.nason.co.jp/wp/wp-content/uploads/2016/08/Napson_EC80P_leaflet_160614.pdf>), and preferably measured using a non-destructive resistivity meter, which can accurately measure the surface resistance independently of the film thickness of an electroconductive part. The non-destructive resistivity meter can start measurement at an arbitrary position on a sample by simple contact of a probe with the sample and without damaging the sample. From this point, it may be referred to as non-contact-type resistivity meter. The surface resistance value of an electroconductive part should be measured with a non-destructive resistivity meter by placing a cut piece of the electroconductive film having a size of 80 mm×50 mm on a flat glass plate with the electroconductive part facing upward and bringing a probe into contact with the electroconductive part. For the measurement of surface resistance value with the EC-80P, the type SW2 is selected and the mode M-H sheet resistance ($\Omega/\square$) is selected. Additionally, a probe can be easily switched with another type of probe depending on the range of measurement, and probes for the measurement ranges from 10 to $1000\Omega/\square$ and from 0.5 to $10\Omega/\square$ are used in the present embodiment. A resistivity meter EC-80P-PN (manufactured by Napson Corporation) can be used instead of a resistivity meter EC-80P to perform the measurement in the same manner, and P-type conduction may be selected from P-type and N-type conductions for the measurement using this instrument. Additionally, the surface resistance value of an electroconductive part should be measured with a contact-type resistivity meter by placing a cut piece of the electroconductive film having a size of 80 mm×50 mm on a flat glass plate with the electroconductive part facing upward and then placing an ASP-probe on the center of the electroconductive part and evenly pressing all the electrode pins on the electroconductive part. For the measurement of surface resistance value with the contact-type resistivity meter, the mode "$\Omega/\square$" as a sheet resistance measurement mode is selected. Once the start button is pushed and the instrument is held, the result of the measurement will be displayed. The measurement of surface resistance value should be performed in an environment at a temperature of 23° C. and a relative humidity of 55% independently of the type of a resistivity meter. Additionally, although an electroconductive film to be measured for surface resistance is placed on a horizontal benchtop, independently of the type of a resistivity meter, to perform the measurement on a flat and even surface, a curled electroconductive film that is unable to keep the surface evenly flat should be fixed with tape or the like on a glass plate to perform the measurement. Three measurement locations are in the central part of the electroconductive film and the arithmetic mean of the surface resistance values at the three locations is determined as the surface resistance value. In this respect, the number of measurement location is 1, 5, or 9 in cases of totally following JIS K7194: 1994. However, once the electroconductive film is actually cut into a size of 80 mm×50 mm and measured as shown in FIG. 5 in JIS K7194: 1994, the electroconductive film may give variable measurement values. Thus, the measurement should be performed on three locations in the central part of the electroconductive part, differing from JIS K7194: 1994. For example, the surface resistance value is measured at the position 1, at a position located between the positions 1 and 7 (preferably, a position close to the position 1), and at a position located between the positions 1 and 9 (preferably, a position close to the position 1) shown in FIG. 5 in JIS K7194: 1994. The preference of a position near the central a sample for the measurement of surface resistance value is also reported in Daichi Isaka and a coworker, "Resistivity measurements for conducting thin films by four-point probe method electroconductive," The Tokyo branch Students' Conference, the Institute of Electronics, Information, and Communication Engineers, 2009 (<URL:https://www.ieice.org/tokyo/gakusei/kenkyuu/14/pdf/120.pdf>). The minimum surface resistance value of the electroconductive film 10 is $1\Omega/\square$ or more, $5\Omega/\square$ or more, or $10\Omega/\square$ or more in ascending order of preference (a higher value is more preferred), while the maximum surface resistance value of the electroconductive film 10 is $200\Omega/\square$ or less, $100\Omega/\square$ or less, $70\Omega/\square$ or less, $60\Omega/\square$ or less, or $50\Omega/\square$ or less in ascending order of preference (a lower value is more preferred).

The electroconductive parts 12 preferably have a film thickness of less than 300 nm. In cases where the electroconductive parts have a film thickness of 300 nm or more, the film thickness of the light-transmitting resin is accordingly too thick and all the electroconductive fibers are covered with the light-transmitting resin, so that it is likely that none of the electroconductive fibers are exposed on the surfaces of the electroconductive parts and no electricity is conducted from the surfaces of the electroconductive parts. The thicker the film thickness of the electroconductive parts is, the more frequently the electroconductive fibers overlap with each other and a low surface resistance value of $1\Omega/\square$ or more and $10\Omega/\square$ or less can be achieved. However, excessive overlap of the electroconductive fibers may result in difficulty in maintenance of a low haze value. Thus, the film thickness is preferably 300 nm or less. The electroconductive parts are preferably a thin film in terms of optical properties and from the viewpoint of thinning the electroconductive film, as long as it can maintain a low surface resistance value. The maximum film thickness of the electroconductive parts 12 is 145 nm or less, 140 nm or less, 120 nm or less, 110 nm or less, 80 nm or less, or 50 nm or less in ascending order of preference (a lower value is more preferred) from the viewpoint of thinning the electroconductive film and obtaining excellent optical properties such as a low haze value. Additionally, the minimum film thickness of the electroconductive parts 12 is preferably 10 nm or more. In cases where the electroconductive parts have a film thickness of less than 10 nm, the film thickness of the light-transmitting resin 15 is accordingly too thin, so that it is likely that some electroconductive fibers are removed from the electroconductive parts, or the durability of the electroconductive parts is reduced, or the abrasion resistance is reduced. Additionally, each electroconductive fiber preferably has a relatively large fiber diameter to control the instabilities, such as higher tendency for breakage. The fiber diameter that allows each electroconductive fiber to keep stably its form is considered to be 10 nm or more or 15 nm or more. On the other hand, the minimum film thickness of the electroconductive parts 12 is more preferably 20 nm or more or 30 nm or more because two or more electroconductive fibers are desired to overlap with and contact with each other to obtain stable electrical conductivity.

The film thickness of the electroconductive parts 12 is determined as the arithmetic mean of the thickness values measured at randomly selected 10 locations, wherein the thickness values are determined at the 10 locations in cross-sectional images of the electroconductive parts photographed using a scanning transmission electron microscope (STEM) or a transmission electron microscope (TEM). A specific method of photographing cross-sectional images will be described below. First, samples for observing a cross-section are prepared from an electroconductive film by the same method as described above. If these samples conduct no electricity, images observed by STEM will appear blurry. Thus, the samples are preferably sputtered with Pt—Pd for about 20 seconds. The sputtering time can be appropriately adjusted but needs careful attention; a period of 10 seconds is too short, and a period of 100 seconds is so long that the metal used for sputtering is observed as particulate foreign bodies. Then, a cross-sectional image of a STEM sample is photographed using a scanning transmission electron microscope (STEM) (product name "S-4800 (Type 2)"; manufactured by Hitachi High-Technologies Corporation). The cross-section is observed and imaged under STEM by setting the detector switch (signal selection) to "TE," the accelerating voltage to "30 kV," and the emission current to "10 µA." The focus, contrast, and brightness are appropriately adjusted at a magnification of 5,000 to 200,000 times so that each layer can be identified. The magnification is preferably in the range from 10,000 to 100,000 times, more preferably in the range from 10,000 to 50,000 times, and most preferably in the range from 25,000 to 50,000 times. The cross-section may be imaged by additionally setting the beam monitor aperture to 3 and the objective lens aperture to 3, and also setting the WD to 8 mm. For the measurement of the film thickness of the electroconductive parts, it is important that the contrast at the interface between the electroconductive parts and another layer (such as the light-transmitting functional layer or the embedding resin) can be observed as clearly as possible upon observation of a cross-section. If the interface is hard to be observed due to a lack of contrast, the surfaces of the electroconductive parts may undergo any pretreatment process commonly used for electron microscopy, such as formation of a metal layer of Pt—Pd, Pt, Au, or the like by sputtering. In addition, the sample may be stained with osmium tetraoxide, ruthenium tetraoxide, phosphotungstic acid, or the like because such staining enables easier observation of the interface between organic layers. Additionally, the contrast of the interface may be hard to be observed at a higher magnification. In that case, the sample is also observed at a lower magnification at the same time. For example, a pair of magnifications consisting of a higher magnification and a lower magnification, such as 25,000 and 50,000 times or 50,000 and 100,000 times, is used for observation to obtain the above-described arithmetic means at both the magnifications, and the further averaged value is determined as the film thickness of the electroconductive parts.

The electroconductive parts 12 preferably contain no particles, such as inorganic particles, having a particle size larger than the film thickness of the light-transmitting resin 15. If the electroconductive parts contain such particles, some of the particles are protruded from the surface of the light-transmitting resin and cause to increase the film thickness of the electroconductive parts. In this respect, if a particle is protruded from the surface of the light-transmitting resin, the film thickness of the electroconductive parts is determined as the distance from the surface of the electroconductive parts on the side of the light-transmitting base material to the top of the particle. Additionally, the electroconductive parts 12 more preferably contain no particles, such as inorganic particles, regardless of the size of the particles. However, for example, metallic core particle residues obtained during an intermediate process to prepare electroconductive fibers 16 or any modifying materials for the electroconductive fibers are considered as an integral part of the electroconductive fibers and, thus, should not be included in the above-described particles. The electroconductive parts 12 may contain inorganic fibers made of a material different from that of the electroconductive fibers 14.

When the surface resistance value of the electroconductive parts 12 of a manufactured product is measured, it can be considered that the electroconductive performance is uniform in any part, and that the surface resistance value is the same at the central part and the end part of the product. Therefore, the measurement location of the surface resistance value is not limited to the central part of the manufactured product, but may be an end part. In cases where the surface resistance value of the electroconductive parts 12 of a manufactured product is measured, the following pretreatment may be appropriately performed. The pretreatment method is not limited to the following method as long as the pretreated product becomes available for the measurement, and it is critical to avoid any influence on electroconductive fibers. That is, in cases where an electroconductive part is already clearly visible and the thickness of an adhesive layer can be presumed to be very thin, measurement can be performed without any further treatment and there is no need to peel off the electroconductive part entirely by force. However, the manufactured product is preferably pretreated to reduce the thickness as thin as possible. For example, in cases where an electroconductive film is used as a touch panel sensor, a cover film or glass is layered on the electroconductive film through an adhesive layer. Thus, a cutter blade is first inserted into the adhesive layer from the edge to peel off the cover film or glass. When the cover film or glass is not easily removed, the electroconductive film proceeds to the next step without removing the cover film or glass by force. Next, the electroconductive film is immersed in and withdrawn from warm water at 40° C. for 10 seconds three times. Then, detachment of the adhesive layer is checked with a cutter or the like, and in some cases the electroconductive film is immersed in and withdrawn from warm water at 40° C. for 10 seconds further three times. Subsequently, the adhesive layer is slowly peeled off with a tool which will never damage the electroconductive part (a thin and flat tool without a blade). The adhesive layer need not be removed entirely as long as the adhesive layer at measurement locations is removed. The present pretreatment can also be used for measuring anything other than the surface resistance value.

The electroconductive parts 12 function, for example, as electrode lines in the X direction in a projected capacitive touch panel and comprise plural sensing portions 12B aligned in the X direction and plural connectors (not shown) that are connected to the sensing portions 12B, as shown in FIG. 2. Each sensing portion 12B is located at a rectangular active area for sensing a touch position, while each connector is located at a non-active area adjacent to and surrounding the active area.

Each sensing portion 12B comprise a straight extending linear portion 12C and an expanded portion 12D extending from the linear portion 12C. In FIG. 2, linear portions 12C extend straight along a direction intersecting with the arrangement direction of sensing portions 12B. The expanded portion 12D is an outwardly expanded portion extending from a linear portion 12C on the surface of the light-transmitting base material 11. Thus, the width of each sensing portions 12B is broadened at an area where an expanded portion 12D is provided. In the present embodiment, each expanded portion 12D has an outer contour in a substantially square shape. The shape of each expanded portion 12D is not limited to a substantially square shape and it may take a diamond shape or a stripe shape.

<Light-Transmitting Resin>

The light-transmitting resin 15 covers electroconductive fibers 16 to prevent removal of the electroconductive fibers 16 from the electroconductive parts 12 and to improve the durability or abrasion resistance of the electroconductive parts 12, and covers electroconductive fibers 16 to such an extent that the electroconductive parts 12 can conduct electricity from the surfaces 12A. Specifically, the light-transmitting resin 15 preferably covers electroconductive fibers 16 in a manner that will leave some of the electroconductive fibers 16 exposed on the surfaces 12A of the electroconductive parts 12, because it is likely that the electroconductive parts can conduct no electricity from the surfaces, as described above, when some electroconductive fibers are not exposed on the surfaces of the electroconductive parts. For example, the film thickness of the light-transmitting resin 15 should be adjusted to cover electroconductive fibers 16 with the light-transmitting resin 15 in a manner that will leave some of the electroconductive fibers 16 exposed on the surfaces 12A of the electroconductive parts 12. That is, in cases where the film thickness of the light-transmitting resin is too thick, all the electroconductive fibers are covered with the light-transmitting resin, so that it is likely that none of the electroconductive fibers are exposed on the surfaces of the electroconductive parts and no electricity is conducted from the surfaces of the electroconductive parts. In cases where the film thickness of the light-transmitting resin is too thin, it is likely that some electroconductive fibers are removed from the electroconductive parts, or the durability of the electroconductive parts or the abrasion resistance is reduced.

Furthermore, the electroconductive fibers as a whole within the electroconductive parts may be no longer unevenly distributed on the light-transmitting base material side than the position located at half the film thickness of the electroconductive parts. For this reason, it is necessary to adjust the film thickness of the light-transmitting resin to an appropriate thickness.

Considering the above, the light-transmitting resin 15 preferably has a film thickness of less than 300 nm. The film thickness of the light-transmitting resin 15 can be measured by the same measurement method as for the film thickness of the electroconductive parts 12. The upper limit of the film thickness of the light-transmitting resin 15 is 145 nm or less, 140 nm or less, 120 nm, 110 nm or less, 80 nm or less, or 50 nm or less in ascending order of preference (a lower value is more preferred). Additionally, the lower limit of the film thickness of the light-transmitting resin 15 is preferably 10 nm or more.

The light-transmitting resin 15 is not limited to a particular light-transmitting resin as long as it is a light-transmissive resin, and examples of the light-transmitting resin include polymers of polymerizable compounds and thermoplastic resins. Polymerizable compounds similar to those described for the light-transmitting functional layer 14 are included as examples of the polymerizable compound, and further description is thus omitted here.

<Reaction Inhibitor>

A reaction inhibitor is a substance that inhibits reduction in electrical conductivity after application of the light-transmitting resin composition due to the reaction of the electroconductive fibers 16 with substances in the atmosphere. Examples of the reaction inhibitor include nitrogen-containing compounds, such as benzoazole compounds, triazole compounds, tetrazole compounds, isocyanurate compounds, and aniline compounds. Examples of the nitrogen-containing compound used as a reaction inhibitor include 1-amino-benzoazole, 5-methylbenzotriazole, 1,2,3-benzotriazole, 1-methyl-1H-tetrazole-5-amine, DL-α-tocopherol, 1-octadecanethiol, 2-mercapto-5-(trifluoromethyl) pyridine, diallyl isocyanurate, diallyl propyl isocyanurate, 6-anilino-1,3,5-triazine-2,4-dithiol, thiocyanuric acid, 3,5-dimethyl-1H-1,2,4-triazole, 4-(1,2,4-triazol-1-ylmethyl)aniline, 6-(dibutylamino)-1,3,5-triazine-2,4-dithiol, 4-(1,2,4-triazol-1-yl)aniline, 2-methylthio-benzothiazole, 1-phenyl-5-mercapto-1H-tetrazole, 5-mercapto-1-methyltetrazole, 5-(methylthio)-1H-tetrazole, 5-amino-1H-tetrazole, 1-(2-dimethylaminoethyl)-5-mercaptotetrazole, 1-(2-dimethylaminoethyl)-5-mercaptotetrazole, 1-(4-hydroxyphenyl)-5-mercapto-1H-tetrazole, 3-amino-5-mercapto-1,2,4-triazole, and 3,5-diamino-1,2,4-triazole.

The content of a reaction inhibitor in the electroconductive parts 12 is preferably 0.01% by mass or more and 10% by mass or less. In cases where the content of the reaction inhibitor is less than 0.01% by mass, the electroconductive fibers may react with substances in the atmosphere, which in turn results in reduced electrical conductivity. Additionally, although the reaction inhibitor reacts with the surface of electroconductive fibers and thus inactivates the surface of electroconductive fibers, and renders the resulting electroconductive fibers less prone to react with substances in the atmosphere, the reaction inhibitor may react not only with the surface of electroconductive fibers but also with the inside of the electroconductive fibers, which in turn results in reduced electrical conductivity in cases where the content of the reaction inhibitor is more than 10% by mass.

<Electroconductive Fibers>

Preferably, a plurality of the electroconductive fibers 16 are present in the electroconductive parts 12. The electroconductive fibers contact with each other in the thickness direction of the electroconductive parts 12, as indicated by the ability of the electroconductive parts 12 to conduct electricity from the surface 12A.

The electroconductive fibers 16 preferably contact with each other to form a network structure (meshwork) in the surface direction (two-dimensional direction) of the electroconductive parts 12 in the light-transmitting base material 11 side than the position HL, which is located at half the film thickness of the electroconductive parts 12. Formation of a network structure by the electroconductive fibers 16 enables efficient creation of a conductive path with the electroconductive fibers 16 even in a small amount.

Some of the electroconductive fibers 16 are preferably exposed on the surfaces 12A of the electroconductive parts 12. The phrase "some of the electroconductive fibers are exposed on the surfaces of the electroconductive parts" as used herein should refer to exposure of some electroconductive fibers on the surfaces of the electroconductive parts in such an extent that the electroconductive fibers are anchored to the electroconductive parts, including electroconductive fibers protruded from the surfaces of the electroconductive parts. In cases where some electroconductive fibers are not exposed on the surfaces of the electroconductive parts, the electroconductive parts may conduct no electricity from the surfaces. Once electrical conduction from the surfaces 12A of the electroconductive parts 12 is identified by the above-described measurement method, some of the electroconductive fibers 16 can thus be determined to be exposed on the surfaces 12A of the electroconductive parts 12.

The electroconductive fibers 16 preferably have a fiber diameter of 200 nm or less. In cases where the electroconductive fibers have a fiber diameter of more than 200 nm, the resulting electroconductive film may have a higher haze value or a poor light transmittance. The minimum fiber diameter of the electroconductive fibers 16 is more preferably 10 nm or more from the viewpoint of the electrical conductivity of the electroconductive parts 12, and a more preferred range of fiber diameter in the electroconductive fibers 16 is 15 nm or more and 50 nm or less. The electroconductive fibers 16 most preferably have a fiber diameter of 30 nm or less.

The fiber diameter of the electroconductive fibers 16 will be obtained as the arithmetic mean of the fiber diameters of 100 electroconductive fibers in 50 images photographed at a magnification of 100,000 to 200,000 times, for example, using a transmission electron microscope (TEM) (product name "H-7650"; manufactured by Hitachi High-Technologies Corporation), which are measured on the acquired images by a software program accessory to the TEM. The fiber diameters are measured using the above-described H-7650 by setting the accelerating voltage to "100 kV," the emission current to "10 μA," the condenser lens aperture to "1," the objective lens aperture to "0," the observation mode to "HC," and the Spot to "2." Additionally, the fiber diameters of the electroconductive fibers can also be measured by a scanning transmission electron microscope (STEM) (product name "S-4800 (Type 2)"; manufactured by Hitachi High-Technologies Corporation). In that case, the fiber diameter of the electroconductive fibers will be obtained as the arithmetic mean of the fiber diameters of 100 electroconductive fibers in 50 images photographed at a magnification of 100,000 to 200,000 times using the STEM, which are measured on the photographed images by a software program accessory to the STEM. The fiber diameters are measured using the above-described S-4800 (Type 2) by setting the signal selection to "TE," the accelerating voltage to "30 kV," the emission current to "10 μA," the probe current to "Norm," the focus mode to "UHR," the condenser lens 1 to "5.0," the WD to "8 mm," and the Tilt to "0°."

When the fiber diameter of the electroconductive fibers 16 is determined, a measurement sample prepared by the following method is used. In this respect, TEM measurement is performed at high magnifications and it is consequently critical to reduce the concentration of the electroconductive fiber-containing composition as much as possible for the purpose of preventing overlap of the electroconductive fibers as much as possible. Specifically, the electroconductive fiber-containing composition is preferably diluted with water or alcohol depending on the dispersion medium used in the composition to reduce the concentration of electroconductive fibers to 0.05% by mass or less or to reduce the content of solids to 0.2% by mass or less. Furthermore, a drop of the diluted electroconductive fiber-containing composition is applied on a grid mesh with a carbon supporting film for TEM or STEM observation, dried at room temperature, and then observed under the above-described conditions, and the resulting observation image data is used to calculate the arithmetic mean. As the grid mesh with a carbon supporting film, a Cu grid with the model "#10-1012, Elastic Carbon Film ELS-C10 in the STEM Cu100P grid specification" is preferred, and any grid having better resistance against electron beam exposure and a higher electron beam transmittance than a plastic supporting film, and thus being suitable for observation at a high magnification, and having better resistance against organic solvents is also preferred. Additionally, a drop of the diluted electroconductive fiber-containing composition could be applied on a grid mesh placed on a slide glass because the grid mesh is so small that it is difficult to apply the drop of the diluted electroconductive fiber-containing composition on a plain grid mesh.

The above-described fiber diameter can be obtained by image-based measurement or may be calculated from the binarized image data. In the case of actual measurement, images may be printed or enlarged as appropriate. In that case, each electroconductive fiber is visualized in darker black than other components. A starting point and an end point are selected on the outer counter of each fiber and the distance between the starting point and the ending point is measured. The concentration of electroconductive fibers will be obtained based on the ratio of the mass of the electroconductive fibers to the total mass of the electroconductive fiber-containing composition, while the content of solids will be obtained based on the ratio of the mass of all components except for the dispersion medium (including the electroconductive fibers, the resin component, and other additives) to the total mass of the electroconductive fiber-containing composition.

The electroconductive fibers 16 preferably have a fiber length of 1 μm or more. In cases where the electroconductive fibers 16 have a fiber length of less than 1 μm, an electroconductive part having a sufficient electrical conductivity may not be formed and aggregation may occur, which may in turn result in a higher haze value and a low light transmittance. The upper limit of the fiber length of the electroconductive fibers 16 may be 500 μm or less, 300 μm or less, 30 μm or less, or 20 μm or less, while the lower limit of the fiber length of the electroconductive fibers 16 may be 3 μm or more, or 10 μm or more.

The fiber length of the electroconductive fibers 16 will be obtained as the arithmetic mean of the fiber lengths of 100 electroconductive fibers in 10 images photographed at a magnification of 500 to 20,000,000 times, for example, using a scanning electron microscope (SEM) (product name "S-4800 (Type 2)"; manufactured by Hitachi High-Technologies Corporation) on the SEM mode, which are measured on the acquired images by an accessory software program. The fiber lengths are measured using the above-described S-4800 (Type 2) together with a 45° pre-tilted sample stub by setting the signal selection to "SE," the accelerating voltage to "3 kV," the emission current to "10 µA to 20 µA," the SE detector to "Mixed," the probe current to "Norm," the focus mode to "UHR," the condenser lens 1 to "5.0," the WD to "8 mm," and the Tilt to "30°." Because no TE detector is used for SEM observation, it is essential to remove the TE detector before SEM observation. Although either the STEM mode or the SEM mode can be selected as an operation mode of the above-described S-4800, the SEM mode will be used for the measurement of the above-described fiber length.

When the fiber length of the electroconductive fibers 16 is determined, a measurement sample prepared by the following method is used. First, the electroconductive fiber-containing composition is applied on an untreated surface of a polyethylene terephthalate (PET) film in B5 size having a thickness of 50 µm at an application dose of 10 mg/m$^2$, and dried to evaporate the dispersion medium and to place electroconductive fibers on the surface of the PET film, and an electroconductive film is thereby prepared. A piece having a size of 10 mm×10 mm is cut from the central part of the electroconductive film. Then, the cut electroconductive film is attached flat against the tilted surface of a 45° pre-tilted SEM sample stub (model number "728-45"; manufactured by Nissin EM Co., Ltd.; 45° pre-tilted sample stub; 15 mm diameter×10 mm height; made of M4 aluminum) using a silver paste. Furthermore, the cut electroconductive film is sputtered with Pt—Pd for 20 to 30 seconds to obtain electrical conductivity. Because an image of the sample without a suitable sputtered film may not be clearly visible, the sputtering process is appropriately modified in that case.

The above-described fiber length can be obtained by image-based measurement or may be calculated from the binarized image data. In the case of image-based measurement, the measurement will be performed by the same method as described above.

The electroconductive fibers 16 are preferably at least one type of fibers selected from the group consisting of electroconductive carbon fibers, metal fibers such as metal nanowires, metal-coated organic fibers, metal-coated inorganic fibers, and carbon nanotubes.

Examples of the above-described electroconductive carbon fiber include vapor grown carbon fiber (VGCF), carbon nanotube, wire cup, and wire wall. These electroconductive carbon fibers may be used individually or in combination of two or more.

As the above-described metal fibers, fibers produced by, for example, a wire drawing process or coil shaving process that prepares a thin and long wire of a metal, such as stainless steel, iron, gold, silver, copper, aluminum, cobalt, nickel, titanium, or an alloy thereof can be used. Such metal fibers may be used individually or in combination of two or more. The metal fibers are preferably metal nanowires having a fiber diameter of 200 nm or less, preferably 50 nm or less, more preferably 30 nm or less, and a fiber length of 1 µm or more, preferably 15 µm or more, more preferably 20 µm or more.

Examples of the above-described metal-coated organic fibers include acrylic fibers coated with a metal such as gold, silver, aluminum, nickel, or titanium. Such metal-coated synthetic fibers may be used individually or in combination of two or more.

<<Nonconductive Part>>

The nonconductive parts 13 are a part sandwiched between electroconductive parts 12 and having no electrical conductivity. In the present specification, if the resistance value (surface resistance value) on the surfaces of the nonconductive parts is 1500Ω/□ or more, it is determined that the nonconductive parts do not exhibit conductivity. As shown in FIG. 3, the nonconductive parts 13 contain a light-transmitting resin and substantially no electroconductive fibers 16. The phrase "nonconductive parts contain substantially no electroconductive fibers" as used herein means that the nonconductive parts may contain a small amount of electroconductive fibers under a condition where an electrical short circuit between electroconductive parts is not formed across the nonconductive parts even if metal ions from the electroconductive parts migrate to and permeated into the nonconductive parts. The nonconductive parts 13 preferably contain none of the electroconductive fibers 16. When electroconductive fibers 16 are removed from the nonconductive parts 13 by sublimating the electroconductive fibers 16 through exposure to laser light as described below, a certain amount of an electroconductive material as a component of the electroconductive fibers 16 may be left as a residue. However, the residual electroconductive materials are not considered as electroconductive fibers because those residual materials are not in fiber form. In the present specification, etching by laser light is called dry etching.

The three-dimensional arithmetic average roughness SRa on the surfaces 13A of the nonconductive parts 13 is 3 nm or more. When the SRa on the surfaces 13A of the nonconductive parts 13 is 3 nm or more, the electroconductive fibers 16 do not remain in the nonconductive parts 13 or even if the electroconductive fibers 16 remain, only a few of the electroconductive fibers 16 remain in the nonconductive parts 13. Therefore, when metal ions migrate to and permeate into the nonconductive parts 13 from the electroconductive parts 12, an electrical short circuit between the electroconductive parts 12 can be inhibited. The three-dimensional arithmetic average roughness SRa is obtained by extending the arithmetic average roughness Ra, which is a two-dimensional roughness parameter described in JIS B0601: 1994, to three dimensions. The above-described SRa can be calculated from a three-dimensional roughness curve surface obtained by measurement with a contact-type surface roughness meter or a non-contact-type surface roughness meter (for example, an interference microscope, a confocal microscope, an atomic force microscope). The data of the three-dimensional roughness curve surface is represented by points arranged in a grid pattern at an interval of d on the reference plane (the horizontal direction is the x-axis and the vertical direction is the y-axis) and the height at the position of the point. That is, when the height at the i-th position in the x-axis direction and the j-th position in the y-axis direction (hereinafter referred to as (i, j)) is expressed as $Z_{i,j}$, the above SRa is calculated by the following formula:

$$SRa = \frac{1}{N}\sum_{i,j}^{N} |Z_{i,j}|$$ [Formula 1]

In the formula, N is the total number of points.

The three-dimensional roughness curve surface is preferably measured using an interference microscope for simplicity. Examples of such an interference microscope include a white-light interference microscope such as the "New View" series manufactured by Zygo Corporation.

The SRa is also calculated by the following formula, wherein the roughness curve surface is Z (x, y) on the reference plane on which the orthogonal coordinate axes X and Y are placed, and the reference plane size is Lx and Ly.

$$SRa = \frac{1}{A} \int_0^{Lx} \int_0^{Ly} |Z(x, y)| dx dy \quad \text{[Formula 2]}$$

In the formula, $A = Lx \times Ly$.

In order to obtain the above-described SRa on the surfaces of the nonconductive parts using a white-light interference microscope (product name "New View 7300", manufactured by Zygo Corporation), one or more samples of a square of 218 µm or more including a nonconductive part are first obtained from the electroconductive film. For the size of each sample, from the viewpoint of handling properties, a square of about 1 cm is sufficient. Each sample is cut from an arbitrary site on the electroconductive film where no dirt or fingerprints are present. Then, under the following measurement conditions and analysis conditions, the SRa is measured for each sample at five locations on the surface of the nonconductive part, and the arithmetic mean of the SRa at five or more locations is defined as SRa. Although the SRa is displayed as "Ra" on the above-described New View 7300, the Ra measured by New View 7300 indicates a three-dimensional arithmetic average roughness and is different than the two-dimensional arithmetic average roughness Ra defined in JIS B0601: 2013. As the software for the measurement and analysis, Microscope Application of MetroPro ver9.0.10 is used. The low wavelength as below corresponds to the cut-off value λc in the roughness parameter.

(Measurement Conditions)
  Objective lens: 50×
  Zoom: 1×
  Measurement area: 218 µm×218 µm
  Resolution (interval per point): 0.22 µm
  Scan length: 5 µm
  Min mod: 0.001%
(Analysis Conditions)
  Removed: Plane
  Filter: High Pass
  FilterType: GaussSpline
  Low wavelength: 250 µm
  High wavelength: 3 µm
  Remove spikes: on
  Spike Height (xRMS): 2.5
  Analysis range: Nonconductive part width (µm)×218 µm Specifically, using the above-described New View 7300, in order to obtain the above-described SRa, for example, on the surface of a nonconductive part on an electroconductive film on which the width of the nonconductive part is 30 µm and the width of two electroconductive parts adjacent to the nonconductive part is 3 mm or more, first of all, the electroconductive film is cut in such a way that the width of the electroconductive parts is 3 mm and the length of the electroconductive parts and the nonconductive part is 45 mm to obtain one to three samples having a nonconductive part with a width of 30 µm sandwiched between 3 mm-wide electroconductive parts. Then, under the following measurement conditions and analysis conditions, each sample is measured for the SRa at five locations on the surface of the nonconductive part, and the arithmetic mean of SRa at a total of 5 to 15 locations is defined as SRa.

(Measurement Conditions)
  Objective lens: 50×
  Zoom: 1×
  Measurement area: 218 µm×218 µm
  Resolution (interval per point): 0.22 µm
  Scan length: 5 µm
  Min mod: 0.001%
(Analysis Conditions)
  Removed: Plane
  Filter: High Pass
  FilterType: GaussSpline
  Low wavelength: 250 µm
  High wavelength: 3 µm
  Remove spikes: on
  Spike Height (xRMS): 2.5
  Analysis range: 30 µm×218 µm The lower limit of the SRa on the surfaces 13A of the nonconductive parts 13 is preferably 4 nm or more, and more preferably 5 nm or more. The upper limit of the SRa on the surfaces 13A of the nonconductive parts 13 is preferably higher to some extent in order to inhibit the visual recognition of the pattern shape of the electroconductive parts or the nonconductive parts (so-called bone appearance phenomenon). However, the SRa is preferably 80 nm or less because when SRa is too large, white turbidity may be caused. The upper limit of the SRa is preferably 50 nm or less, and further preferably 35 nm or less.

Because the nonconductive parts 13 are formed together with the electroconductive parts 12 as an integrated body, the film thickness of the nonconductive parts is less than 300 nm. The upper limit of the film thickness of the nonconductive parts 13 is 145 nm or less, 140 nm or less, 120 nm or less, 110 nm or less, 80 nm or less, 50 nm or less, 30 nm or less, or 10 nm or less in ascending order of preference (a lower value is more preferred). Additionally, the lower limit of the film thickness of the nonconductive parts 13 is preferably 10 nm or more. The film thickness of the nonconductive parts 13 will be measured by the same method as for the film thickness of the electroconductive parts 12.

As shown in FIG. 3, the nonconductive parts 13 comprise the light-transmitting resin 15. The nonconductive parts 13 may be formed by dry etching and may have the resulting voids 13B which are not filled with electroconductive fibers 16. In that case, the sublimated electroconductive fibers 16 burst out through areas to be the nonconductive parts 13 during the formation of the nonconductive parts 13 and the resulting nonconductive parts 13 have rough surfaces 13A. The light-transmitting resin 15 in the nonconductive parts 13 is the same as the light-transmitting resin 15 in the electroconductive parts 12, and the description of the light-transmitting resin is omitted here.

<<Production Methods of Electroconductive Films>>

The electroconductive film 10 can be produced, for example, as follows. First, a light-transmitting functional layer composition is applied on the other surface 11B of the light-transmitting base material 11 and dried to form a coating film 31 of the light-transmitting functional layer composition, as shown in FIG. 6 (A).

The light-transmitting functional layer composition contains a polymerizable compound, and may contain the above-described inorganic particles, the above-described leveling agent, a solvent, and a polymerization initiator as necessary. Furthermore, the light-transmitting functional layer composition may be supplemented with, for example, a conventionally known dispersing agent, surfactant, silane coupling agent, thickener, coloring inhibitor, coloring agent (pigment and dye), antifoam agent, flame retardant, ultraviolet absorber, adhesion promoter, polymerization inhibitor, antioxidant, surface modifier, and/or lubricant in accordance with various purposes of, for example, increasing hardness, reducing cure shrinkage, and/or controlling refractive index in the light-transmitting functional layer.

<Solvent>

Examples of the solvent include alcohols (such as methanol, ethanol, propanol, isopropanol, n-butanol, s-butanol, t-butanol, benzyl alcohol, PGME, and ethylene glycol), ketones (such as acetone, methyl ethyl ketone (MEK), cyclohexanone, methyl isobutyl ketone, diacetone alcohol, cycloheptanone, and diethyl ketone), ethers (such as 1,4-dioxane, dioxolane, diisopropyl ether dioxane, and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl formate, methyl acetate, ethyl acetate, propyl acetate, butyl acetate, and ethyl lactate), cellosolves (such as methyl cellosolve, ethyl cellosolve, and butyl cellosolve), cellosolve acetates, sulfoxides (such as dimethyl sulfoxide), amides (such as dimethylformamide and dimethylacetamide), and combinations thereof.

<Polymerization Initiator>

The polymerization initiator is a component that generates radicals or ionic species upon degradation induced by exposure to light or heat and initiates or promotes the polymerization (cross-linking) of a polymerizable compound. Examples of a polymerization initiator used in the light-transmitting functional layer composition include photopolymerization initiators (for example, photo-radical polymerization initiators, photo-cationic polymerization initiators, photo-anionic polymerization initiators), thermal polymerization initiators (for example, thermal radical polymerization initiators, thermal cationic polymerization initiators, thermal anionic polymerization initiators), and combinations thereof.

Examples of the above-described photo-radical polymerization initiator include benzophenone-based compounds, acetophenone-based compounds, acylphosphine oxide-based compounds, titanocene-based compounds, oxime ester-based compounds, benzoin ether-based compounds, and thioxantone.

Among the above-described photo-radical polymerization initiators, commercially available photo-radical polymerization initiators include, for example, Irgacure 184, Irgacure 369, Irgacure 379, Irgacure 651, Irgacure 819, Irgacure 907, Irgacure 2959, Irgacure OXE01, and Lucirin TPO (all are manufactured by BASF Japan Ltd.); NCI-930 (manufactured by ADEKA Corporation); SpeedCure EMK (manufactured by Nihon SiberHegner K.K.); and benzoin methyl ether, benzoin ethyl ether, and benzoin isopropyl ether (all are manufactured by Tokyo Chemical Industry Co., Ltd.).

Examples of the above-described photo-cationic polymerization initiator include aromatic diazonium salts, aromatic iodonium salts, and aromatic sulfonium salts. Among the above-described photo-cationic polymerization initiators, commercially available photo-cationic polymerization initiators include, for example, Adeka Optomer SP-150 and Adeka Optomer SP-170 (both are manufactured by ADEKA Corporation).

Examples of the above-described thermal radical polymerization initiator include peroxides and azo compounds. Among those, high-molecular-weight azo initiators consisting of high-molecular-weight azo compounds are preferred. Examples of the high-molecular-weight azo initiator include high-molecular-weight azo initiator having a structure composed plural units of, for example, a polyalkylene oxide or a polydimethyl siloxane linked to each other via an azo group.

Examples of the above-described high-molecular-weight azo initiator having a structure composed of plural units of, for example, a polyalkylene oxide linked to each other via an azo group include a polycondensate of 4,4'-azobis(4-cyanopentanoic acid) and a polyalkylene glycol, and a polycondensate of 4,4'-azobis(4-cyanopentanoic acid) and a polydimethyl siloxane having a terminal amino group.

Examples of the above-described peroxide include ketone peroxide, peroxy ketal, hydroperoxide, dialkyl peroxide, peroxy esters, diacyl peroxide, and peroxy dicarbonate.

Among the above-described thermal radical polymerization initiators, examples of commercially available thermal radical polymerization initiators include Perbutyl O, Perhexyl O, and Perbutyl PV (manufactured by NOF Corporation); V-30, V-501, V-601, VPE-0201, VPE-0401, and VPE-0601 (manufactured by Wako Pure Chemical Industries, Ltd.).

Examples of the above-described thermal cationic polymerization initiator include various onium salts, such as quaternary ammonium salts, phosphonium salts, and sulfonium salts. Among the above-described thermal cationic polymerization initiators, examples of commercially available thermal cationic polymerization initiators include ADEKA Opton CP-66, and ADEKA Opton CP-77 (manufactured by ADEKA Corporation); SAN AID SI-60L, SAN AID SI-80L, SAN AID SI-100L (manufactured by Sanshin Chemical Industry Co., Ltd.); and CI series (manufactured by Nippon Soda Co., Ltd.).

The content of a polymerization initiator in the light-transmitting functional layer composition is preferably 0.5 parts by mass or more and 10.0 parts by mass or less relative to 100 pars by mass of the polymerizable compound. By limiting the content of the polymerization initiator to a value within the above range, hard coat properties can be well maintained and cure inhibition can be inhibited.

The method of applying the light-transmitting functional layer composition include known coating methods, such as spin coating, dipping, spraying, slide coating, bar coating, roll coating, gravure coating, and die coating methods.

Next, the coating film 31 is exposed to ionizing radiation such as ultraviolet light or heated, as shown in FIG. 6 (B), to polymerize (cross-link) the polymerizable compound and to cure the coating film 31, whereby the light-transmitting functional layer 14 is formed.

In cases where ultraviolet light is used as the ionizing radiation to cure the light-transmitting functional layer composition, the ultraviolet light or the like emitted from, for example, a super high pressure mercury lamp, high pressure mercury lamp, low pressure mercury lamp, carbon arc lamp, xenon arc lamp, or metal halide lamp can be used. Additionally, the wavelength range from 190 to 380 nm can be used as the wavelength of ultraviolet light. Specific examples of the source of electron beam include various types of electron beam accelerators, such as Cockcroft-Walton type, Van de Graft type, resonant transformer type, insulating core transformer type, linear type, Dynamitron type, and high frequency type accelerators.

After the light-transmitting functional layer 14 is formed on the other surface 11B of the light-transmitting base material 11, an electroconductive fiber-containing composition containing electroconductive fibers 16 and an organic dispersion medium is applied on one surface 11A of the light-transmitting base material 11, and dried to place a plurality of the electroconductive fibers 16 on one surface 11A, as shown in FIG. 7 (A). The organic dispersion medium may contain water in a content of 10% by mass. An aqueous dispersion medium may be used instead of the organic dispersion medium. The aqueous dispersion medium contains 10% by mass or more of water. The electroconductive fiber-containing composition may also contain a resin material consisting of a thermoplastic resin or a polymerizable compound, in addition to the electroconductive fibers 16 and the organic dispersion medium. However, in cases where the content of the resin material in the electroconductive fiber-containing composition is excessively high, the resin material permeates into the space between the electroconductive fibers and the electrical conductivity of the electroconductive parts is consequently deteriorated. Thus, the content of the resin material is needed to be appropriately adjusted. The term "resin material" as used herein inclusively refers to a component such as polymerizable compound that can be polymerized to a resin, in addition to a resin (however, excluding a resin (for example, polyvinylpyrrolidone) as a component of an organic protective layer that is formed surrounding electroconductive fibers in the preparation of the electroconductive fibers, for the purpose of, for example, preventing the electroconductive fibers from weld anchoring to each other or from reacting with substances in the atmosphere). Additionally, the resin material in the electroconductive fiber-containing composition becomes an integral part of the light-transmitting resin 15 after the formation of the electroconductive parts 12.

The organic dispersion medium is not limited to a particular organic dispersion medium, and is preferably a hydrophilic organic dispersion medium. Examples of the organic dispersion medium include saturated hydrocarbons, such as hexane; aromatic hydrocarbons, such as toluene and xylene; alcohols, such as methanol, ethanol, propanol, and butanol; ketones, such as acetone, methyl ethyl ketone (MEK), methyl isobutyl ketone, and diisobutyl ketone; esters, such as ethyl acetate and butyl acetate; ethers such as tetrahydrofuran, dioxane, and diethyl ether; amides, such as N,N-dimethylformamide, N-methylpyrrolidone (NMP), and N,N-dimethylacetamide; and halogenated hydrocarbons, such as ethylene chloride and chlorobenzene. Among those organic dispersion media, alcohols are preferred in terms of the stability of the electroconductive fiber-containing composition.

Examples of a thermoplastic resin that may be contained in the electroconductive fiber-containing composition include acrylic resins; polyester resins, such as polyethylene terephthalate; aromatic resins, such as polystyrene, polyvinyl toluene, polyvinyl xylene, polyimide, polyamide, and polyamide-imide; polyurethane resins; epoxy resins; polyolefin resins; acrylonitrile-butadiene-styrene copolymer (ABS); cellulose-based resins; polyvinyl chloride resins; polyacetate resins; polynorbornene resins; synthetic rubber; and fluorine-based resins.

Examples of a polymerizable compound that may be contained in the electroconductive fiber-containing composition include polymerizable compounds similar to that described for the light-transmitting functional layer 14, and the description of the polymerizable compound is omitted here.

After a plurality of the electroconductive fibers 16 are placed on the light-transmitting base material 11, a light-transmitting resin composition containing a polymerizable compound and a solvent is applied on it and dried to form a coating film 32 of the light-transmitting resin composition, as shown in FIG. 7 (B). The light-transmitting resin composition containing the polymerizable compound and the solvent may additionally contain a polymerization initiator and the above-described reaction inhibitor as necessary. In this respect, although a reaction inhibitor can be added to an electroconductive fiber-containing composition, the addition of the reaction inhibitor to the electroconductive fiber-containing composition may cause coating of the surface of electroconductive fibers with the reaction inhibitor before the electroconductive fibers form a network structure, which in turn deteriorates the electrical conductivity. Thus, a reaction inhibitor is preferably added to the light-transmitting resin composition.

Next, the coating film 32 is exposed to ionizing radiation such as ultraviolet light, as shown in FIG. 8 (A), to polymerize (cross-link) the polymerizable compound and to cure the coating film 32, whereby the light-transmitting resin 15 is formed, and the electroconductive layer 33 is thus formed.

After the electroconductive layer 33 is formed, areas to be the nonconductive parts on the electroconductive layer 33 are subjected to dry etching (for example irradiation of laser light such as infrared laser) to generate a pattern on the electroconductive layer 33, as shown in FIG. 8 (B). Upon irradiation of laser light to the regions of the prospective nonconductive parts, electroconductive fibers 16 included in the regions are sublimated by the heat of the laser light. The sublimated electroconductive fibers 16 burst out through the light-transmitting resin 15. For this reason, holes and fragments are formed on the surfaces 13A of the nonconductive parts 13 (the surface of the light-transmitting resin 15 present in the nonconductive parts 13 in the present embodiment). Thus, the surfaces 13A of the nonconductive parts 13 are roughened. Furthermore, when the output of the laser light is increased, not only the electroconductive fibers 16 but also the light-transmitting resin 15 are sublimated. As a result, the surfaces 13A of the nonconductive parts 13 are further roughened. Thus, an electroconductive film 10 comprising the electroconductive parts 12 and the nonconductive parts 13 shown in FIG. 1 can be obtained.

According to the present embodiment, since the three-dimensional arithmetic average roughness SRa on the surfaces 13A of the nonconductive parts 13 is 3 nm or more, an electrical short circuit between the electroconductive parts 12 can be inhibited. That is, when the electroconductive fibers 16 are sublimated as described above, the surfaces 13A of the nonconductive parts 13 are roughened, which results in an increased three-dimensional arithmetic average roughness on the surfaces 13A of the nonconductive parts 13. The more electroconductive fibers 16 sublimate, the more holes and fragments are formed on the surfaces 13A of the nonconductive parts 13. As a result, the three-dimensional arithmetic average roughness on the surfaces 13A of the nonconductive parts 13 tends to increase. When the three-dimensional arithmetic average roughness SRa on the surfaces 13A of the nonconductive parts 13 is 3 nm or more, the nonconductive parts 13 contain substantially no electroconductive fiber 16. Therefore, by setting the arithmetic average roughness on the surfaces 13A of the nonconductive parts 13 to 3 nm or more, even when an electroconductive material from the electroconductive parts 12 migrates to and permeates into the nonconductive parts 13, an electrical short circuit between electroconductive parts 12 can be inhibited.

When the three-dimensional arithmetic average roughness SRa on the surfaces of the nonconductive parts is less than 3 nm, the pattern shape of the electroconductive parts or the nonconductive parts may be visually recognized (so-called bone appearance phenomenon). However, since the three-dimensional arithmetic average roughness SRa on the surfaces 13A of the nonconductive parts 13 is 3 nm or more, the visual recognition of the pattern shape of the electroconductive parts or the nonconductive parts can be inhibited.

In the present embodiment, the contact points between the electroconductive fibers 16 can be increased in cases where the electroconductive fibers 16 as a whole in the electroconductive parts 12 are unevenly distributed on the light-transmitting base material 11 side than the position HL, which is located at half the film thickness of the electroconductive parts 12. This allows ensuring electrical conduction from the surfaces 12A of the electroconductive parts 12 and thus for achieving a lower surface resistance value, even if the content of electroconductive fibers 16 is low. Additionally, a lower haze value can be achieved because the content of electroconductive fibers 16 can be reduced. Furthermore, a majority of the electroconductive fibers 16 in the electroconductive parts 12 are covered with the light-transmitting resin 15 in cases where the electroconductive fibers 16 are unevenly distributed on the light-transmitting base material 11 side than the position HL, which is located at half the film thickness of the electroconductive parts 12. This allows the inhibition of the reduction of the electrical conductivity due to the reaction with sulfur, oxygen, and/or halogens in the air.

When the electroconductive layer is dry-etched (etching by irradiation of laser light), the width of the laser light is the narrowest at the focal point. Therefore, when the focal point of the laser light is adjusted to the vicinity of the interface between the electroconductive layer and the light-transmitting base material, the width of the laser light irradiated to the vicinity of the surface of the electroconductive layer becomes larger than at the focal point. As a result, when the laser beam is irradiated to the electroconductive layer in which the electroconductive fibers are uniformly present, the width of the nonconductive parts becomes larger near the surface of the electroconductive layer than at the vicinity of the interface between the electroconductive parts and the light-transmitting base material, even if an attempt is made to form nonconductive parts at a fine pitch. However, in the present embodiment, the electroconductive fibers 16 as a whole in the electroconductive layer 33 are unevenly distributed on the light-transmitting base material 11 side than the position HL, which is located at half the film thickness of the electroconductive layer 33. In this case, when the laser light is irradiated, the width of the nonconductive parts 13 which is larger than at the vicinity of the interface between the electroconductive layer 33 and the light-transmitting base material 11 can be inhibited since only a few electroconductive fibers 16 are present near the surface of the electroconductive layer 33, thereby forming the nonconductive parts 13 at a fine pitch.

Even in conventional electroconductive films, some electroconductive films have an electroconductive part containing a light-transmitting resin and electroconductive fibers incorporated in the light-transmitting resin, and the electroconductive parts of those electroconductive films are formed using an electroconductive fiber-containing composition containing electroconductive fibers and a resin material. In this respect, an aqueous dispersion medium is mainly used as a dispersion medium in an electroconductive fiber-containing composition used for a conventional electroconductive part. For using an aqueous dispersion medium, an electroconductive fiber-containing composition may contain a large content of a resin material in view of storage stability and ability to provide a homogeneous coating film upon application. In this case, even if an electroconductive part is formed using an electroconductive fiber-containing composition, it is difficult to distribute electroconductive fibers as a whole unevenly on a light-transmitting base material side than the position located at half the film thickness of the electroconductive part. Therefore, by controlling the content of this resin material to a reduced amount, the electroconductive fibers 16 in the electroconductive parts 12 can be unevenly distributed on the light-transmitting base material 11 side than the position HL, which is located at half the film thickness of the electroconductive parts 12.

According to the present embodiment, the light-transmitting resin 15 in the electroconductive parts 12 contains a reaction inhibitor, and can consequently prevent the electroconductive fibers 16 from reducing the electrical conductivity due to the reaction with sulfur, oxygen, and/or halogens in the atmospheric air.

An electroconductive part will be contacted with a light-transmitting adhesive layer when an electroconductive film is incorporated into an image display device; when the electroconductive part in contact with the light-transmitting adhesive layer is tested in a humidity/heat resistance test by leaving them for 240 hours, for example, in an environment at a temperature of 60° C. and a relative humidity of 90%, an environment at a temperature of 85° C. and a relative humidity of 85%, or an environment at a higher temperature and a higher relative humidity, electroconductive fibers may react with components of the light-transmitting adhesive layer (for example, an acidic component that constitutes the adhesive layer itself, and/or an additive that has been added to the adhesive layer) depending on the type of the light-transmitting adhesive layer, which in turn increases the surface resistance of the electroconductive part. In this respect, according to the present embodiment, a reaction inhibitor contained in the electroconductive parts 13 can inhibit the reaction of the electroconductive fibers 16 with components of a light-transmitting adhesive layer, even if the electroconductive parts 12 in contact with the light-transmitting adhesive layer are tested by the humidity/heat resistance test. Accordingly, the number of light-transmitting adhesive layer choices can be increased.

According to the present embodiment, the use of electroconductive fibers 16, differing from ITO, enables providing an electroconductive film 10 which is hardly broken when folded. Thus, the electroconductive film 10 can be incorporated into a foldable image display device and then used.

Figure 9:
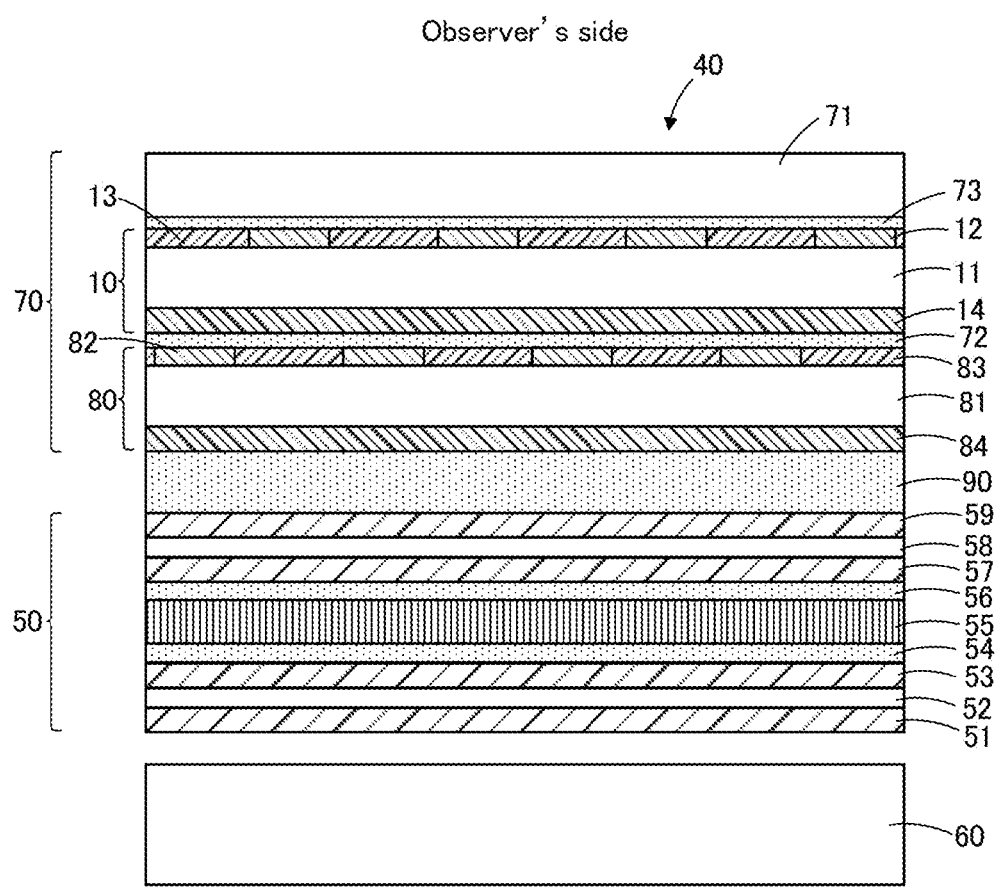
FIG. 9 depicts a schematic diagram of an image display device according to one embodiment.
Figure 10:
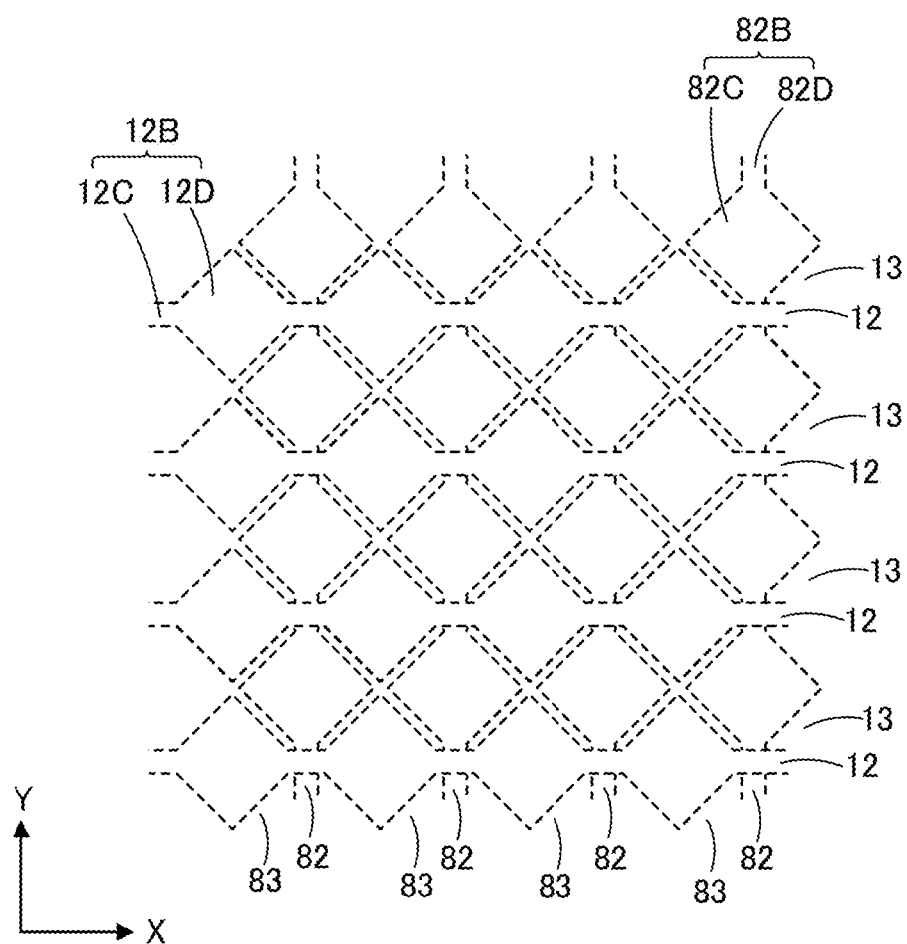
FIG. 10 depicts a schematic top view of a touch panel according to one embodiment.

The application of an electroconductive film according to the present embodiment is not limited to a particular application. For example, the electroconductive film 10 of the present embodiment can be incorporated into an image display device. Additionally, the electroconductive film 10 may be used, for example, as an electro-magnetic interference shield. FIG. 9 depicts a schematic diagram of an image display device according to the present embodiment; FIG. 10 depicts a schematic top view of a touch panel according to the present embodiment. In FIGS. 9 and 10, the elements indicated by the same reference numbers as in FIG. 1 are the same as those indicated in FIG. 1, and further description is thus omitted.

<<<Image Display Device>>>

As shown in FIG. 9, an image display device 40 mainly comprises a display panel 50 for displaying images, a backlight unit 60 placed on the back surface of the display panel 50, a touch panel 70 placed on the observer's side of the display panel 50, and a light-transmitting adhesion layer 90 intervening between the display panel 50 and the touch panel 70. In the present embodiment, the display panel 50 is a liquid-crystal display panel and the image display device 40 thus comprises the backlight unit 60 but may not comprise the backlight unit 60 depending on the type of the display panel (display element).

<<Display Panel>>

The display panel 50 has a laminate structure, as shown in FIG. 9, composed of a protective film 51 made of, for example, a triacetyl cellulose film (TAC film) or a cycloolefin polymer film, a polarizer 52, a protective film 53, a light-transmitting adhesive layer 54, a display element 55, a light-transmitting adhesive layer 56, a protective film 57, a polarizer 58, and a protective film 59 in this order from the backlight unit 60 to the observer's side. The display panel 50 should comprise the display element 55 and may not comprise the protective film 51 or the like.

The display element 55 is a liquid-crystal display element. However, the display element 55 is not limited to a liquid-crystal display element, and may be a display element using, for example, an organic light-emitting diode (OLED), an inorganic light-emitting diode, and/or a quantum dot light-emitting diode (QLED). The liquid-crystal display element comprises, for example, a liquid-crystal layer, an alignment film, an electrode layer, and a color filter sandwiched between two glass base materials.

<<Backlight Unit>>

The backlight unit 60 illuminates the display panel 50 from the back surface of the display panel 50. Any known backlight unit can be used as the backlight unit 60, and, moreover, the backlight unit 60 may be either an edge light-type or a direct light-type backlight unit.

<<Touch Panel>>

The touch panel 70 comprises an electroconductive film 80, an electroconductive film 10 placed on the observer's side of the electroconductive film 80, a light-transmitting cover member 71, such as a cover glass, placed on the observer's side of the electroconductive film 10, a light-transmitting adhesive layer 72 intervening between the electroconductive film 10 and the electroconductive film 80, and a light-transmitting adhesive layer 73 intervening between the electroconductive film 10 and the light-transmitting cover member 71.

<Electroconductive Film>

The electroconductive film 80 has the same structure as that of the electroconductive film 10. That is, the electroconductive film 80 comprises, shown in FIG. 10, a light-transmitting base material 81, a plurality of light-transmitting electroconductive parts 82 provided on one surface of the light-transmitting base material 81, a light-transmitting nonconductive part 83 provided on one surface of the light-transmitting base material 81 and located between the electroconductive parts 82, and a light-transmitting functional layer 84 provided on the surface opposite to the electroconductive parts 82 and the nonconductive part 83 on the light-transmitting base material 81. The light-transmitting base material is similar to the light-transmitting base material 11 and the light-transmitting functional layer 84 is likewise similar to the light-transmitting functional layer 14, and further descriptions are thus omitted here.

(Electroconductive Part and Nonconductive Part)

The electroconductive parts 82 have the same structure as that of the electroconductive parts 12. That is, the electroconductive parts 82 comprise a light-transmitting resin and electroconductive fibers incorporated in the light-transmitting resin. The nonconductive parts 83 comprise a light-transmitting resin and contain substantially no electroconductive fibers.

The electroconductive parts 82 function as electrode lines in the Y direction in a projected capacitive touch panel and comprise plural sensing electrodes 82B and plural connectors (not shown) that are connected to the sensing electrodes 82B, as shown in FIG. 10. The sensing electrodes 82B have the same structure as that of the sensing electrodes 12B but extend in the Y direction. Since the electroconductive parts 82 have the same structure as that of the electroconductive parts 12, further descriptions are omitted here.

The nonconductive parts 83 are parts sandwiched between electroconductive parts 82 and having no electrical conductivity. The nonconductive parts 83 has, as in the nonconductive parts 13, an arithmetic average roughness on the surfaces of the nonconductive parts 83 of 3 nm or more. Since the nonconductive parts 83 have the same structure as that of the nonconductive parts 13, further description is omitted here.

<Light-Transmitting Adhesive Layer>

Examples of the light-transmitting adhesive layers 72 and 73 include adhesive sheets, such as OCA (optical clear adhesive) sheets. Light-transmitting adhesion layers may be used instead of the light-transmitting adhesive layers 72 and 73.

<<Light-Transmitting Adhesion Layer>>

The light-transmitting adhesion layer 90 intervenes between the display panel 50 and the touch panel 70, and is attached to both the display panel 50 and the touch panel 70. Thus, the display panel 50 and the touch panel 70 are bonded together. The light-transmitting adhesion layer 90 comprises a cured product of, for example, a liquid curable adhesion layer composition comprising a polymerizable compound such as an OCR (optically clear resin).

The light-transmitting adhesion layer 90 preferably has a film thickness of 10 μm or more and 50 μm or less. In cases where the light-transmitting adhesion layer has a film thickness of less than 10 μm, the light-transmitting adhesion layer is so thin that troubles such as jamming of foreign bodies or poor gap filling performance may easily occur; additionally, in cases where the light-transmitting adhesion layer has a film thickness of more than 150 μm, the production cost is too high. The film thickness of the light-transmitting adhesion layer is determined as the arithmetic mean of the film thickness values measured at randomly selected 10 locations, wherein the film thickness values are determined at the 10 locations in cross-sectional images of the light-transmitting adhesion layer acquired using an optical microscope. A light-transmitting adhesive layer may be used instead of the light-transmitting adhesion layer 90.

EXAMPLES

Now, the present invention will be described in more detail by way of examples. However, the present invention is not limited to those examples.

<Preparation of a Hard Coat Layer Composition>

First, the following components were combined to meet the composition requirements indicated below and thereby obtain a hard coat layer composition 1.

(Hard Coat Layer Composition 1)
- A mixture of pentaerythritol triacrylate and pentaerythritol tetraacrylate (product name "KAYARAD PET-30"; manufactured by Nippon Kayaku Co., Ltd.): 30 parts by mass;
- A polymerization initiator (product name "Irgacure 184"; manufactured by BASF Japan Ltd.): 1.5 parts by mass;
- Methyl ethyl ketone (MEK): 50 parts by mass;
- Cyclohexanone: 18.5 parts by mass.

<Preparation of Silver Nanowire-Containing Compositions>

(Silver Nanowire-Containing Composition 1)

Ethylene glycol (EG) as a reducing agent and polyvinylpyrrolidone (PVP; having an average molecular weight of 1,300,000; manufactured by Aldrich) as an organic protecting agent were used to perform the following individual steps of core formation and particle growth to prepare a silver nanowire-containing composition.

1. Core Formation Step

To 100 mL of EG maintained at a temperature of 160° C. in a reaction vessel, 2.0 mL of a silver nitrate solution in EG (having a silver nitrate concentration of 1.0 mol/L) was added at a constant rate with stirring over one minute. Then, silver core particles were formed by reducing silver ions while the temperature was maintained at 160° C. for 10 minutes. The reaction liquid was yellow in color due to the surface plasmon absorption in nano-sized silver particles, confirming the reduction of silver ions and the subsequent formation of silver microparticles (core particles). Then, 10.0 mL of a PVP solution in EG (having a PVP concentration of $3.0 \times 10^{-1}$ mol/L) was added to the reaction liquid at a constant rate over 10 minutes.

2. Particle Growth Step

After the above-described core formation step was completed, the reaction liquid containing the core particles was maintained at a temperature of 160° C. with stirring, to which 100 mL of a silver nitrate solution in EG (having a silver nitrate concentration of $1.0 \times 10^{-1}$ mol/L) and 100 mL of a PVP solution in EG (having a PVP concentration of $3.0 \times 10^{-1}$ mol/L) were added at a constant rate over 120 minutes by using the double-jet technique. In the course of the particle growth step, an aliquot was withdrawn every 30 minutes from the reaction liquid for electron microscopic observation. The observation indicated that the core particles formed in the core formation step grew into the shape of wires with the passage of time but no microparticles were generated during the particle growth step. Measurement of fiber diameter and fiber length in finally obtained silver nanowires indicated that the silver nanowires had a fiber diameter of 30 nm and a fiber length of 15 μm. The fiber diameter of the silver nanowires was obtained as the arithmetic mean of the fiber diameters of 50 electroconductive fibers measured using a transmission electron microscope (TEM) at a magnification of 1000 to 500,000 times. Additionally, the fiber length of the silver nanowires was obtained as the arithmetic mean of the fiber lengths of 50 electroconductive fibers measured using a scanning electron microscope (SEM) at a magnification of 1000 to 500,000 times. The fiber diameters and fiber lengths of the below-described silver nanowires were determined in the same manner.

3. Desalting/Washing Step

After completion of the particle growth step, the reaction liquid was cooled down to room temperature and then applied to an ultrafiltration membrane with a molecular weight cut-off of 0.2 μm for desalting/washing and for solvent exchange to ethanol. The reaction liquid was finally concentrated to a volume of 100 mL to prepare a dispersion of silver nanowires. Finally, the concentrated reaction liquid was diluted with ethanol to achieve a silver nanowire concentration of 0.1% by mass, whereby the silver nanowire-containing composition 1 was obtained.

<Preparation of Light-Transmitting Resin Composition>

The following components were combined to meet the composition requirements indicated below and thereby obtain a light-transmitting resin layer composition 1.

(Light-Transmitting Resin Composition 1)
- A mixture of pentaerythritol triacrylate and pentaerythritol tetraacrylate (product name "KAYARAD PET-30"; manufactured by Nippon Kayaku Co., Ltd.): 5 parts by mass;
- A polymerization initiator (product name "Irgacure 184"; manufactured by BASF Japan Ltd.): 0.25 parts by mass;
- Methyl ethyl ketone (MEK): 70 parts by mass;
- Cyclohexanone: 24.75 parts by mass.

Example 1

First, a polyethylene terephthalate film (product name "Cosmoshine A4100"; manufactured by Toyobo Co., Ltd.) having a thickness of 50 μm and having an underlayer on one surface was prepared as a light-transmitting base material, and a hard coat layer composition was applied on one surface of the polyethylene terephthalate film to form a coating film. Subsequently, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to cure the coating film, whereby a hard coat layer having a film thickness of 2 μm was formed as a light-transmitting functional layer.

After the hard coat layer was formed, the silver nanowire-containing composition 1 was applied at an application dose of 10 mg/m$^2$ on an untreated surface of the polyethylene terephthalate film opposite to the surface carrying the formed hard coat layer. Then, the dispersion medium in the silver nanowire-containing composition 1 was evaporated by dry air blowing at 50° C. at a flow rate of 0.5 m/s for 15 seconds and subsequent dry air blowing at 70° C. at a flow rate of 10 m/s for 30 seconds over the applied silver nanowire-containing composition 1 to place a plurality of silver nanowires on the surface of the hard coat layer.

Subsequently, the above-described light-transmitting resin composition 1 was applied to cover the silver nanowires and to form a coating film. Then, the formed coating film was dried by dry air blowing at 50° C. at a flow rate of 0.5 m/s for 15 seconds and subsequent dry air blowing at 70° C. at a flow rate of 10 m/s for 30 seconds over the coating film to evaporate the solvent in the coating film, and then exposed to ultraviolet light to a cumulative light dose of 100 mJ/cm$^2$ to form a light-transmitting resin having a film thickness of 100 nm by curing the coating film, whereby an electroconductive layer that contained the light-transmitting resin and the silver nanowires incorporated in the light-transmitting resin was obtained.

After the electroconductive layer was formed, the regions to be nonconductive parts were irradiated with laser light under the following conditions, and the silver nanowires present in these regions were sublimated and removed to generate a pattern on the electroconductive layer. Thus, an electroconductive film comprising a 30 μm-wide linear nonconductive parts located between electroconductive parts was obtained.

(Laser Irradiation Conditions)
  Type: YVO$_4$
  Wavelength: 1064 nm
  Pulse width: 8 to 10 ns
  Frequency: 100 kHz
  Spot diameter: 30 μm
  Pulse energy: 16 μJ
  Processing rate: 1200 mm/s Example 2

In Example 2, an electroconductive film was obtained in the same manner as in Example 1, except that the pulse energy of the laser light was 10 μJ.

Example 3

In Example 3, an electroconductive film was obtained in the same manner as in Example 1, except that the pulse energy of the laser light was 24 μJ, and the processing rate was 800 mm/s.

Example 4

In Example 4, an electroconductive film was obtained in the same manner as in Example 1, except that the pulse energy of the laser light was 24 μJ at 400 mm/s.

Comparative Example 1

In Comparative Example 1, an electroconductive film was obtained in the same manner as in Example 1, except that the pulse energy of the laser light was 10 μJ, and the processing rate was 1500 mm/s.

<Measurement of Three-Dimensional Arithmetic Average Roughness SRa on Surfaces of Nonconductive Parts>

Using the white-light interference microscope (product name "New View 7300", manufactured by Zygo Corporation), the surfaces of the nonconductive parts of the electroconductive films according to Examples and Comparative Example were measured for the three-dimensional arithmetic average roughness SRa. Specifically, first of all, the electroconductive film was cut in such a way that the width and the length of two electroconductive parts adjacent to the 30 μm-wide nonconductive part would be 3 mm and 45 mm, respectively, to obtain three samples having a nonconductive part with a width of 30 μm sandwiched between the 3 mm-wide electroconductive parts. Each sample was cut from an arbitrary site where no dirt or fingerprints were present. Then, under the following measurement conditions and analysis conditions, each sample was measured for the SRa at five locations on the surface of the nonconductive part, and the arithmetic mean of SRa at a total of 15 locations was defined as SRa. As the measurement and analysis software, Microscope Application of MetroPro ver9.0.10 was used. The low wavelength as below corresponds to the cut-off value λc in the roughness parameter. Further, during the analysis, in order to calculate the SRa of the nonconductive part alone in the observation region, only the nonconductive part was analyzed by masking the nonconductive part according to the following procedure.

(Measurement Conditions)
  Objective lens: 50×
  Zoom: 1×
  Measurement area: 218 μm×218 μm
  Resolution (interval per point): 0.22 μm
  Scan length: 5 μm
  Min mod: 0.001%

(Analysis Conditions)
  Removed: Plane
  Filter: High Pass
  FilterType: GaussSpline
  Low wavelength: 250 μm
  High wavelength: 3 μm
  Remove spikes: on
  Spike Height (xRMS): 2.5
  Analysis range: 30 μm×218 μm (Procedure for Analyzing Nonconductive Part Only)

First, sample data (dat file) to be masked was loaded from the Load Data on the Microscope Application. Then, the Mask data button on the screen was pressed to display the Mask Editor screen. It was confirmed that the Auto Incl button was displayed on the Mask Editor screen. When it was not displayed, the Auto Excl button was clicked to display the Auto Incl button. The Rectance button on the same screen was clicked, and the mask size of the area to be analyzed was input into the width and height (width 0.03 mm, height 0.218 mm), and the Apply button displayed on the left side was clicked. When the Apply button was clicked, a white frame of the specified size was displayed on the observation image displayed on the same screen. The Move button was pressed, and then the white frame could be dragged to an arbitrary position on the observation image. Thus, the white frame was moved to the nonconductive part. Thereafter, a BG Incl button on the same screen was pressed, an Analyze button on the Microscope Application screen was pressed, and thus, the electroconductive parts were excluded from the analysis range. In this state, the "Ra" was displayed on the same screen and used as the three-dimensional arithmetic average roughness SRa on the surfaces 13A of the nonconductive parts 13.

<Electrical Short Circuit Evaluation>

For the electroconductive films according to Examples and Comparative Example, the electrical short circuit was evaluated. Specifically, first of all, the electroconductive film was cut in such a way that the width and the length of two electroconductive parts adjacent to the 30 μm-wide nonconductive part would be 3 mm and 45 mm, respectively, to obtain a sample having a nonconductive part with a width of 30 μm sandwiched between the 3 mm-wide electroconductive parts. Then, using a tester (product name "Digital MΩ Hitester 3454-11", manufactured by Hioki E.E. Corporation), the presence and absence of a current flow between one electroconductive part and the other electroconductive part was evaluated. Thereafter, a durability test was performed in which a voltage of 32 V was applied to one electroconductive part of the sample for 100 hours in an environment of 65° C. and a relative humidity of 95%. After the durability test, using a tester (product name "Digital MΩ Hitester 3454-11", manufactured by Hioki E.E. Corporation), the presence and absence of a current flow between one electroconductive part and the other electroconductive part was determined to evaluate whether the electrical short circuit occurred or not. The evaluation criteria were as described below.

○: A current did not flow between the electroconductive parts before and after durability test.

X: A current did not flow between the electroconductive parts before the durability test, but the current flowed between the electroconductive parts after the durability test.

<Evaluation of Visual Recognition of Pattern Shape>

The electroconductive films according to Examples and Comparative Example were evaluated to determine whether or not the pattern shape of the electroconductive parts or the nonconductive parts was visually recognized when the surface of the electroconductive film was illuminated with light. Specifically, a black acrylic plate was first placed on a horizontal base, and an electroconductive film was placed thereon with the electroconductive parts facing upward. The electroconductive film had been cut to a size of 50 mm×100 mm without curl or wrinkle and without fingerprints or dust, and was placed on the black acrylic plate. The four corners of the electroconductive film was fixed with tape (product name "Cello Tape®"; manufactured by Nichiban Co., Ltd.). The surface of the electroconductive film was illuminated with light from a three-wavelength fluorescent lamp (product name "Akarin Rod", manufactured by Hitachi Appliances, Inc.) so that the illuminance on the surface of the electroconductive film would be 1000 lux. The electroconductive film was visually observed from all angles at a distance of 30 cm (viewing distance) from the surface to evaluate whether or not the pattern shapes of the electroconductive parts and the nonconductive parts were visually recognized. Furthermore, the surface of the electroconductive film was illuminated with light from an LED (product name "MG-286R", manufactured by GENTOS Co., Ltd.) so that the illuminance on the surface of the electroconductive film would be 10000 lux. The electroconductive film was visually observed from all angles at a distance of 30 cm (viewing distance) from the surface to evaluate whether or not the pattern shapes of the electroconductive parts and the nonconductive parts were visually recognized. The evaluation criteria were as described below.

○: The pattern shapes of the electroconductive parts and the nonconductive parts were not visually recognized by observation at an illuminance of 10,000 lux.

Δ: The pattern shapes of the electroconductive parts and the nonconductive parts were not visually recognized by observation at an illuminance of 1000 lux, but the pattern shape of the electroconductive parts or nonconductive parts was not visually recognized by observation at an illuminance of 10000 lux.

X: The pattern shapes of the electroconductive parts and the nonconductive parts were visually recognized by observation at an illuminance of 1000 lux.

<Evaluation of White Turbidity>

The electroconductive films according to Examples and Comparative Example were evaluated to determine whether or not the white turbidity was observed in the nonconductive parts when the surface of the electroconductive film was illuminated with light. Specifically, a black acrylic plate was first placed on a horizontal base, and an electroconductive film was placed thereon with the electroconductive parts facing upward. The electroconductive film had been cut to a size of 50 mm×100 mm without curl or wrinkle and without fingerprints or dust, and was placed on the black acrylic plate. The four corners of the electroconductive film was fixed with tape (product name "Cello Tape®"; manufactured by Nichiban Co., Ltd.). The surface of the electroconductive film was illuminated with light from a three-wavelength fluorescent lamp (product name "Akarin Rod", manufactured by Hitachi Appliances, Inc.) so that the illuminance on the surface of the electroconductive film would be 1000 lux. The electroconductive film was visually observed from all angles at a distance of 30 cm (viewing distance) from the surface to evaluate whether or not the white turbidity was observed in the nonconductive parts. Furthermore, the surface of the electroconductive film was illuminated with light from an LED (product name "MG-286R", manufactured by GENTOS Co., Ltd.) so that the illuminance on the surface of the electroconductive film would be 10000 lux. The electroconductive film was visually observed from all angles at a distance of 30 cm (viewing distance) from the surface to evaluate whether or not the white turbidity was observed in the nonconductive parts. The evaluation criteria were as described below.

○: The white turbidity was not observed in the nonconductive parts by observation at an illuminance of 10,000 lux.

Δ: Although the white turbidity was not observed in the nonconductive parts by observation at an illuminance of 1000 lux, the white turbidity was observed in the nonconductive parts by observation at an illuminance of 10000 lux.

X: The white turbidity was observed in the nonconductive parts by observation at an illuminance of 1000 lux.

The results are shown in Table 1 below.

TABLE 1

| | SRa (nm) | Electrical short circuit evaluation | Pattern shape evaluation | White turbidity evaluation |
|---|---|---|---|---|
| Example 1 | 13 | ○ | ○ | ○ |
| Example 2 | 6 | ○ | ○ | ○ |
| Example 3 | 59 | ○ | ○ | ○ |
| Example 4 | 83 | ○ | ○ | Δ |
| Comparative example 1 | 2 | X | ○ | ○ |

In the electroconductive film according to Comparative Example 1, since the three-dimensional arithmetic average roughness SRa of the surfaces of the nonconductive parts was less than 3 nm, an electrical short circuit occurred between the electroconductive parts after the durability test. It is believed that this is because many silver nanowires remained in the nonconductive parts, and due to the durability test, silver ions of the electroconductive parts migrated to and permeated into the nonconductive parts. On the other hand, in the electroconductive films according to Examples 1 to 4, since the three-dimensional arithmetic average roughness SRa of the surfaces of the nonconductive parts was 3 nm or more, an electrical short circuit did not occur between the electroconductive parts before and after the durability test. It is believed that this is because there was substantially no silver nanowire remaining in the nonconductive parts, so that even if the silver ions of the electroconductive parts migrated and permeated into the nonconductive parts due to the durability test, an electrical short circuit did not occur between the electroconductive parts.

In the electroconductive films according to Examples 1 to 3, since the three-dimensional arithmetic average roughness SRa on the surfaces of the nonconductive parts was 80 nm or less, the pattern shapes of the electroconductive parts and the nonconductive parts were not visually recognized, and the white turbidity was not observed either in the nonconductive parts. It is believed that this is because the silver nanowires were slightly white, which resulted in, by slightly roughening the surface of the nonconductive parts, the slight whiteness of the nonconductive parts but not at the level of the white turbidity. On the other hand, in the electroconductive film according to Example 4, since the three-dimensional arithmetic average roughness SRa of the surface of the nonconductive parts was more than 80 nm, the pattern shapes of the electroconductive parts and the nonconductive parts were not visually recognized, but the white turbidity was present in the nonconductive parts because the surface of the nonconductive parts was too roughened. In the electroconductive film according to Comparative Example 1, it is thought that, since there was not much difference in color between the electroconductive parts and the nonconductive parts because of the silver nanowires remaining in the nonconductive parts, the pattern shapes of the electroconductive parts and the nonconductive parts were not visually recognized. Since the pattern shape and the white turbidity were correlated with the three-dimensional arithmetic average roughness SRa, the three-dimensional arithmetic average roughness SRa was used for the evaluation. However, among parameters of the surface roughness, there was no correlation with the parameters other than the SRa, such as two-dimensional arithmetic average roughness Ra. Therefore, parameters other than SRa could not be used for the evaluation.

For the electroconductive films according to Examples 1 to 4, the surface resistance value of an electroconductive part was measured using a contact-type resistivity meter (product name "Loresta-AX MCP-T370"; Manufactured by Mitsubishi Chemical Analytech Co., Ltd., Type of sensor: ASP-probe) according to JIS K7194: 1994 (Testing method for resistivity of electroconductive plastics with a four-point probe array). The surface resistance value of each was 50Ω/□. The surface resistance value was measured with the contact-type resistivity meter by placing a cut piece of the electroconductive film having a size of 80 mm×50 mm on a flat glass plate to create a uniformly flat surface, and then placing an ASP-probe on the center of the electroconductive part facing upward and evenly pressing all the electrode pins on the electroconductive part. For the measurement with the contact-type resistivity meter, the mode "Ω/□" as a sheet resistance measurement mode was selected. Subsequently, the start button was pushed and the instrument was held to obtain the result of the measurement. Three locations for the measurement of surface resistance value were in the central part of the electroconductive film and the arithmetic mean of the surface resistance values at the three locations was determined as the surface resistance. The measurement of surface resistance was performed in an environment at a temperature of 23° C. and a relative humidity of 55%.

For the electroconductive films according to Examples 1 to 4, the total light transmittance was measured using a haze meter (product name "HM-150"; manufactured by Murakami Color Research Laboratory Co., Ltd.) according to JIS K7361. The total light transmittance of each was 91%. The total light transmittance was a value measured on the whole electroconductive film and is also determined as the arithmetic mean of three measurement values obtained from one electroconductive film, wherein a sample having a size of 50 mm×100 mm is cut from the electroconductive film and the sample without curl or wrinkle and without any dirt such as fingerprints or grime is then placed in the haze meter in such a manner that the electroconductive parts face in the direction opposite to the light source.

For the electroconductive films according to the Examples 1 to 4, the haze value (total haze value) of each electroconductive film was measured using a haze meter (product name "HM-150"; manufactured by Murakami Color Research Laboratory Co., Ltd.) according to JIS K7136. The haze value of each was 1.0%. The haze value was a value measured on the whole electroconductive film and is also determined as the arithmetic mean of three measurement values obtained from one electroconductive film, wherein a sample having a size of 50 mm×100 mm is cut from the electroconductive film and the sample without curl or wrinkle and without any dirt such as fingerprints or grime is then placed in the haze meter in such a manner that the electroconductive parts face in the direction opposite to the light source.

The electroconductive films according to Examples 1 to 4 were examined to determine whether or not the silver nanowires as a whole in each electroconductive part were unevenly distributed on the polyethylene terephthalate film side than the position located at half the film thickness of the electroconductive parts. The silver nanowires were unevenly distributed in all the electroconductive films. In order to determine whether or not the silver nanowires as a whole in each electroconductive part were unevenly distributed on the polyethylene terephthalate film side than the position located at half the film thickness of the electroconductive parts, the method described below was followed. Specifically, first of all, samples for observing a cross-section were prepared from each electroconductive film. More specifically, a cut piece of the electroconductive film having a size of 2 mm×5 mm was placed in an embedding plate made of silicone, into which an epoxy resin was later poured to embed the whole electroconductive film in the resin. Then, the embedding resin was left to stand at 65° C. for 12 hours or longer and cured. Subsequently, ultra-thin sections were prepared using an ultramicrotome (product name "Ultramicrotome EM UC7"; manufactured by Leica Microsystems GmbH) at a feeding rate of 100 nm. The prepared ultra-thin sections were collected on collodion-coated meshes (150 meshes) to obtain STEM samples. Then, a cross-sectional image of a STEM sample was acquired using a scanning transmission electron microscope (STEM) (product name "S-4800 (Type 2)"; manufactured by Hitachi High-Technologies Corporation). The cross-section was observed and imaged under STEM at a magnification of 25,000 to 50,000 times by setting the detector switch (signal selection) to "TE," the accelerating voltage to "30 kV," and the emission current to "10 µA," and appropriately adjusting the focus, contrast, and brightness so that each layer could be identified. Additionally, the cross-section was imaged by additionally setting the beam monitor aperture to "3" and the objective lens aperture to "3," and also setting the WD to "8 mm." Then, the cross-sectional images at 10 locations acquired as described above were prepared. Next, each image of the cross-section was enlarged to the pixel resolution, and the numbers of pixels covering the silver nanowires distributed on the polyethylene terephthalate film side than the position located at half the film thickness of the electroconductive part and covering the silver nanowires distributed from the position located at half the film thickness of the electroconductive part to the surface of the electroconductive part were counted in each cross-sectional image to determine the ratio of the number of pixels covering the silver nanowires distributed on the polyethylene terephthalate film side than the above-described half-length position relative to the total number of pixels covering all the silver nanowires. For the pixels covering a silver nanowire, each pixel on the line running through the above-described half-length position would be divided into a portion located from the above-described half-length position to the polyethylene terephthalate film and the remaining portion located from the above-described position to the surface of the electroconductive part, to divide one pixel based on the area ratio between the divided portions. Then, the above-described ratio determined from each cross-sectional image was determined as the abundance of electroconductive fibers distributed on the polyethylene terephthalate film side than the position located at half the film thickness of the electroconductive part, and the arithmetic mean of the abundance values determined from the cross-sectional images was calculated. In cases where the arithmetic mean was 55% or more, the electroconductive fibers were determined to be unevenly distributed toward the polyethylene terephthalate film.

For the electroconductive films according to Examples 1 to 4, a foldability test was performed to evaluate the flexibility. In every foldability test which is described below, the electrical resistance value ratio was 1.5 or less. Specifically, first of all, a rectangular sample having a size of 125 mm length×50 mm width including an electroconductive part was cut from the electroconductive film. After the sample was cut from the electroconductive film, a silver paste (product name "DW-520H-14"; manufactured by Toyobo Co., Ltd.) was applied on the surfaces of both longitudinal ends of the sample, having a size of 10 mm length×50 mm width, and heated at 130° C. for 30 minutes to obtain the sample retaining the cured silver pastes on both the terminal regions. Then, the electrical resistance of the sample retaining the cured silver pastes on both the terminal regions was measured using a tester (product name "Digital MΩ Hitester 3454-11"; manufactured by Hioki E.E. Corporation). Specifically, because the Digital MΩ Hitester 3454-11 comprised two probe terminals (a red probe terminal and a black probe terminal; both are pin-type terminals), the red probe terminal and the black probe terminal were respectively contacted with the cured silver paste provided on one terminal region and that provided on the other terminal region to measure the electrical resistance. Subsequently, the selected sample having the short edges (50 mm) anchored with anchoring members was mounted to an endurance testing machine (product name "DLDMLH-FS"; manufactured by Yuasa System Co., Ltd.) in such a manner that the minimum distance between the two opposing edges was 6 mm (the outer width of the bent part: 6 mm), as shown in FIG. 5 (C), and the sample with the electroconductive part facing inward was folded back and then unfolded (a foldability test performed on the sample with the electroconductive part facing inward and the base material facing outward), and the process was repeated twenty thousand times. After the foldability test was performed, the sample after the foldability test was measured for electrical resistance on the surface of the electroconductive part, similarly to the sample before the foldability test. Then, the electrical resistance ratio, namely the ratio of the electrical resistance value measured after the foldability test on the selected sample to that measured before the foldability test on the same sample (the electrical resistance of the selected sample after the foldability test/the electrical resistance of the same sample before the foldability test), was calculated. Additionally, a sample cut from each of the electroconductive films according to Examples 1 to 4 and selected based on the measured electrical resistance in the same manner as described above was mounted to the above-described endurance testing machine in the same manner as described above, and the sample with the base material facing inward was folded back and then unfolded (a foldability test performed on the sample with the electroconductive part facing outward and the base material facing inward), and the process was repeated twenty thousand times, and the sample after the foldability test was similarly measured for electrical resistance on the surface of the electroconductive part to calculate the electrical resistance ratio. The arithmetic mean of three measurements was determined as the electrical resistance ratio.

LIST OF REFERENCE NUMERALS

10, 80 Electroconductive film
10A Surface
11 Light-transmitting base material
12 Electroconductive part
12A Surface
13 Nonconductive part
13A Surface
14 Light-transmitting functional layer
15 Light-transmitting resin
16 Electroconductive fibers
40 Image display device
50 Display panel
65 Display element
70 Touch Panel

The invention claimed is:

1. An electroconductive film comprising a light-transmitting base material, a plurality of light-transmitting electroconductive parts provided on one surface of the light-transmitting base material, and a light-transmitting nonconductive part located between the electroconductive parts,
   wherein each of the electroconductive parts contains a light-transmitting resin and electroconductive fibers incorporated in the light-transmitting resin;
   the nonconductive part contains a light-transmitting resin and exhibits no conductivity;
   the three-dimensional arithmetic average roughness on a surface of the nonconductive part opposite the light transmitting base material is 6 nm or more and 80 nm or less; and
   relative to a mid-point in the thickness direction of the electroconductive parts, the electroconductive fibers are unevenly distributed within the electroconductive parts such that there are more electroconductive fibers on the side facing the light-transmitting base material compared with the other side in the thickness direction.

2. The electroconductive film according to claim 1, wherein the electroconductive fiber has a fiber length of 1 μm or more.

3. The electroconductive film according to claim 1, wherein the electroconductive fiber has a fiber diameter of 200 nm or less.

4. The electroconductive film according to claim 1, wherein the electroconductive film has a haze value of 5% or less.

5. The electroconductive film according to claim 1, wherein the electroconductive film has a total light transmittance of 80% or more.

6. The electroconductive film according to claim 1, wherein each of the conductive parts has a thickness of less than 300 nm.

7. The electroconductive film according to claim 1, wherein the nonconductive part has a thickness of less than 300 nm.

8. A touch panel comprising the electroconductive film according to claim 1.

9. An image display device comprising the touch panel according to claim 8.

10. An image display device comprising the electroconductive film according to claim 1.

* * * * *